US011884484B2

(12) United States Patent
Cileli

(10) Patent No.: US 11,884,484 B2
(45) Date of Patent: Jan. 30, 2024

(54) BIN AID

(71) Applicant: Mehmet Cileli, Caroline Springs (AU)

(72) Inventor: Mehmet Cileli, Caroline Springs (AU)

( * ) Notice: Subject to any disclaimer, the term of this patent is extended or adjusted under 35 U.S.C. 154(b) by 457 days.

(21) Appl. No.: 17/147,082

(22) Filed: Jan. 12, 2021

(65) Prior Publication Data

US 2021/0130087 A1 May 6, 2021

Related U.S. Application Data

(63) Continuation of application No. PCT/AU2019/050739, filed on Jul. 12, 2019.

(30) Foreign Application Priority Data

Jul. 12, 2018 (AU) ................................ 2018902530

(51) Int. Cl.
*B65F 1/14* (2006.01)
*B65F 7/00* (2006.01)
*B65F 1/16* (2006.01)

(52) U.S. Cl.
CPC .......... *B65F 1/1421* (2013.01); *B65F 1/1638* (2013.01); *B65F 7/00* (2013.01); *B65F 2210/129* (2013.01); *B65F 2210/139* (2013.01); *B65F 2210/165* (2013.01); *B65F 2210/168* (2013.01); *B65F 2210/172* (2013.01)

(58) Field of Classification Search
CPC ........ B65F 1/1421; B65F 1/1638; B65F 7/00; B65F 2210/129; B65F 2210/139; B65F 2210/165; B65F 2210/168; B65F 2210/172
USPC .......................................................... 220/211
See application file for complete search history.

(56) References Cited

U.S. PATENT DOCUMENTS 2,732,155 A * 1/1956 Stanley ................. B65F 1/1421 248/147
3,201,075 A * 8/1965 Sievers ................. B65F 1/1421 248/316.4

(Continued)

FOREIGN PATENT DOCUMENTS

CN 106429101 A 2/2017
CN 111361895 A * 7/2020

(Continued)

OTHER PUBLICATIONS

International Search Report issued for corresponding International Application No. PCT/AU2019/050739 dated Oct. 11, 2019.

(Continued)

*Primary Examiner* — J. Gregory Pickett
*Assistant Examiner* — Niki M Eloshway
(74) *Attorney, Agent, or Firm* — Myers Wolin, LLC

(57) ABSTRACT

A bin aid is provided that is adapted to raise and lower a bin lid of a bin, the bin aid including a main body and a connection means functionally connectable with the main body and able to functionally engage with the bin lid. The connection means includes a rotatable unit and a control means for controlling one or more functions to aid the use of a bin including to selectively control the connection means. The connection means is able selectively to raise and to lower the bin lid with respect to the closely located bin.

27 Claims, 20 Drawing Sheets

(56) References Cited

U.S. PATENT DOCUMENTS

| | | | | | |
|---|---|---|---|---|---|
| 3,224,595 | A * | 12/1965 | Roy | B65F 1/1421 | 211/83 |
| 3,527,356 | A * | 9/1970 | Herdy | B65F 1/1421 | D34/6 |
| 2009/0161907 | A1 * | 6/2009 | Healey | B65F 1/14 | 340/666 |
| 2010/0308045 | A1 | 12/2010 | Tong | | |
| 2012/0234353 | A1 * | 9/2012 | Wiley | B08B 9/093 | 134/109 |
| 2016/0023847 | A1 * | 1/2016 | Guild | B65F 1/1646 | 49/386 |

FOREIGN PATENT DOCUMENTS

| | | | | |
|---|---|---|---|---|
| CN | 112209059 | A * | 1/2021 | B64C 39/02 |
| EP | 1854743 | A1 | 11/2007 | |
| KR | 101028413 | B1 | 4/2011 | |
| KR | 1020120116535 | A | 10/2012 | |
| WO | WO-2016054109 | A1 * | 4/2016 | B65F 1/163 |

OTHER PUBLICATIONS

International-Style Search Report issued for corresponding AU Patent Application No. 2018902530 dated Dec. 18, 2018.

* cited by examiner

BIN AID

CROSS-REFERENCE TO RELATED APPLICATIONS

This application is a continuation of International Patent Application No. PCT/AU2019/050739, filed Jul. 12, 2019, which takes priority from Australian Patent Application No. 2018902530, filed Jul. 12, 2018, the contents of each of which are incorporated by reference herein.

FIELD OF THE INVENTION

The invention relates to an aid for a bin or receptacle, and in particular, the invention relates to a device for use with a bin or other receptacle, the device being adapted to automatically raise and lower the lid of a bin or receptacle, or to provide other conveniences.

BACKGROUND

Bins and other receptacles may take a range of shapes and forms and may be used in a variety of contexts. They conventionally include a container body and a lid or cover; the lid or cover operates to protect or securely store the contents of the container body. In the context of rubbish bins, a lid or cover acts to prevent the escape of unwanted odours or rubbish from the container body, and also to deter the ingress of animals or unwanted access to the bin. The operation of a rubbish bin lid or cover is especially relevant where a rubbish bin is kept in a location accessible to the public at large.

In some examples, bins or other receptacles are made to include an automatically opening or closing lid. In particular examples, the automatic lid of a bin may be responsive to motion at or near the location of the bin lid. In other examples, automatic bin lids may operate to sense objects located on the bin lid and then open the lid downward to deposit the object in the body of the bin. These examples relate to bin lids which are built into the bin, or at least an upper section of the bin, and do not act on an existing bin lid itself.

In still other examples, a foot pedal may be included to mechanically open a bin lid in response to downward pressure applied to the pedal. These examples having mechanical operation are less convenient as they require the physical exertion of the user, may be prone to break down due to mechanical failure resulting from user interaction with the mechanical part, and may also be difficult to apply to existing bins or bin lids.

Where a person has their hands full, particularly with the objects they want to deposit into a bin, they may find it difficult to open and/or close a bin lid without having to put the objects down. This may be inconvenient if there are a number of different objects which could be time consuming to put down and pick up individually. Furthermore, due to disability, old age, physical impairments or other circumstances, some persons may have difficulty using, cleaning, managing or maintaining bins or other receptacles. The difficulties may be particularly apparent where the bin and/or bin lid is large, heavy and/or difficult to reach. Able bodied persons may also benefit from an aid that opens and closes a bin lid to coincide with the times they are depositing material into bins, or an aid which provides for other conveniences.

A technical problem resides in creating a bin aid that is able to be used with existing bins, and which desirably has advantages of providing ease of access. For example, advantages provided may include providing a mechanism that operates consistently to automatically raise or lower the bin lid without damaging the bin or bin lid, or that the bin lid automatically opens when someone, or something, approaches the bin, or advantages which provides an increase in convenience. A technical problem also resides in assisting with the depositing of material into the bin by automatically opening the bin lid and keeping the bin lid open for such a time to permit depositing of material into the bin body, thereby offering increased convenience for the user. It is preferable for the bin lid to automatically close after objects have been deposited into the bin body. Other aspects of bin use, including cleaning and bin management (e.g. remembering which bin of many is the right one to be placed on the street on a given day), are recognised as being areas for improvement.

Previous arrangements of the types described above are not entirely satisfactory, and there is accordingly a need to address one or more of the abovementioned or other limitations of the state of the art, or at least provide a useful alternative.

It is to be understood that, if any prior art information is referred to herein, such reference does not constitute an admission that the information forms part of the common general knowledge in the art, in Australia or any other country.

SUMMARY

The present invention arises from a recognition that improvements in relation to the accessibility and convenience of bins or other receptacles can be achieved by providing a device for use with a bin or other receptacle adapted to automatically raise and lower the lid of a bin or receptacle, or by providing other features to improve convenience.

According to one aspect of the invention, there is provided a bin aid adapted to raise and lower a bin lid of a bin, the bin aid including: a main body; a connection means functionally connectable with the main body and able to functionally engage with the bin lid; and a control means for controlling one or more functions to aid the use of a bin including to selectively control the at least one connection means; wherein the at least one connection means is able selectively to raise and to lower the bin lid with respect to the closely located bin.

According to a further aspect of the invention, there is provided a bin aid adapted to raise and lower a bin lid of a bin, the bin aid including: a main body; a connection means connected with the main body and able to functionally engage with, and to functionally disengage from, the bin lid; and a control means for selectively controlling the at least one connection means to selectively raise and lower the bin lid of the bin.

According to a further aspect of the invention, there is a provided a bin aid adapted to raise and lower a bin lid of a bin, the bin aid including: a connection means able to functionally engage with, and to functionally disengage from, the bin lid; and a control means for selectively controlling the at least one connection means to selectively raise and lower the bin lid.

Preferably, the connection means includes a rotatable unit.

Preferably, the connection means includes a bin lid engaging element.

The rotatable unit may include receiving means for receiving an engaging element for engaging with the bin lid. The receiving means is preferably able to lock together with the engaging element.

Preferably, the receiving means includes a jaw. The jaw preferably includes a spring loaded upper and/or lower portion, the upper or lower portion being movable to open to receive, and movable to close to lock together with, the engaging element.

Preferably, the engaging element includes a swing.

The engaging element is preferably able to lock together with the rotatable unit such that the swing and rotatable unit move together when the rotatable unit moves.

The rotatable unit is preferably adapted to pull the swing downwardly.

Preferably, the rotatable unit and/or swing is able to translate. The rotatable unit and/or swing is preferably able to translate upwardly and/or downwardly. Downward translation of the rotatable unit and/or swing preferably enables raising the bin lid, and upward translation of the rotatable unit preferably enables lowering of the bin lid.

Preferably, the rotatable unit and/or swing is able to translate inwardly to and/or outwardly from the bin. Inward translation of the rotatable unit and/or swing occurs preferably enables raising the bin lid and outward translation preferably enables lowering the bin lid.

Preferably, the swing is able to rotate and translate.

Preferably, the rotatable unit is able to rotate and translate the swing.

Preferably, the rotatable element and/or swing is adapted to rotate away from the bin to enable raising the bin lid, and to rotate toward the bin to enable closing the bin lid.

Preferably, the swing includes at least one portion having a shape that is complementary to the shape of the receiving means of the rotatable element. The at least one complementary shaped portion of the swing may have a non-circular cross section. The at least one complementary shaped portion may include at least three planar faces. Preferably, the at least one complementary shaped portion has a rectangular cross-section.

Preferably, the at least one complementary shaped portion of the swing comprises a middle portion of the swing. The at least one complementary shaped portion of the swing may comprise a bar.

The engaging element is preferably adapted to raise or lower the bin lid by applying a force to the underside of the bin lid. Preferably, the force is able to be applied by pivoting the engaging element upon the bin. Preferably, pivoting of the engaging element occurs as the swing moves. Preferably, the pivoting is upon a handle of the bin.

In a preferred form, the engaging element includes at least one lifter for engaging with the underside of the bin lid.

Preferably, the engaging element is able to engage with a first underside section of the bin lid, and a second opposing underside section of the bin lid on the other side of the lid.

The engaging element preferably includes one or more arms that extend outwardly from the swing. Preferably, the arms extend inwardly towards the bin when in situ.

Preferably, the at least one lifter is locatable at the end of each arm.

Each at least one lifter preferably includes a lifting element for engaging the underside surface of the bin lid. Preferably, the lifting element is able to rest on the upper surface of a rim of the bin when the bin lid is in a closed position.

Preferably, the lifting element includes a planar section. The lifting element may include a winged section. Preferably, the winged section is adapted to engage with increased surface area of the lower surface of the bin lid.

Preferably, each at least one lifter is removably connectable to end of each arm.

Preferably, each at least one lifter includes a shaped part to pivot on a bin handle. The shaped part is preferably shaped to have a complementary fit with an exterior surface of the bin handle. In a preferred form, the shaped part is semicircular or 'U' shaped.

Preferably, the engaging element is adapted to extend across a width of the bin lid. The engaging element may be adapted to have an adjustable width. In a preferred form, the engaging element is adjustable in width to fit bins having different widths. Preferably, the middle portion of the swing and/or the arms are adjustable in length to adjust the width of the engaging element.

The connection means preferably includes a translation element for moving the rotatable unit. Preferably, the translation element is cyclically moveable. The translation element is preferably connectable to the rotatable unit. The translation element may comprise a shaft. The rotatable unit is preferably rotatable with respect to the shaft.

Preferably, the translation element is engageable with a drive unit to translate the shaft upwardly and downwardly. Preferably, the drive unit is able to translate the shaft downwardly or upwardly in a cyclical manner to selectively raise or lower the bin lid. The shaft includes may include a rack for interacting with a pinion in the drive unit.

The translation element may comprise a chain including a plurality of chain elements. Preferably, chain elements in the chain are able to be translated downwardly or upwardly for selectively raising or lowering the bin lid.

In a preferred form, the rotatable unit includes direct receiving means for directly receiving the bin lid. Preferably, the direct receiving means is able to lock together with the bin lid. Preferably, the direct receiving means is able to lock together with bin lid such that the bin lid and direct receiving means move together when the direct receiving means moves. Preferably, the direct receiving means is able to receive and lock together with a rearward portion of the bin lid. Preferably, the direct receiving means is able to push the rearward portion of the bin lid downwardly to provide for raising of an opposing frontward portion of the bin lid.

The direct receiving means is preferably adapted to rotate and translate. In a preferred form, the direct receiving means is adapted to rotate and translate the rearward portion of the bin lid Preferably, the connection means includes a pivot means. Preferably, the pivot means is connectable to the rotatable unit. Preferably, the pivot means is able to move the rotatable unit upwardly and/or downwardly. Preferably the pivot means is able to move the rotatable unit inwardly to and outwardly from the main body.

Preferably, the pivot means is able to rotate relative to the main body.

Preferably, the pivot means includes a shaft connectable to the rotatable unit that is movable upwardly and/or downwardly.

Preferably, the control means controls the rotating of the rotatable unit and/or the translating of the translation element and/or the pivoting of the pivot means.

Preferably, the control means includes one or more electronic control functions operative to move, rotate and/or translate the connections means, or a part thereof.

Preferably, the bin aid is adapted to aid the use of a closely located bin.

According to a further aspect of the invention, there is provided a bin aid adapted to aid the use of a closely located bin including to raise and lower a bin lid of the bin, the bin aid including: a main body; at least one connection means functionally connected with the main body and able to functionally engage with a bin lid of a closely located bin; a control means for controlling a plurality of functions to aid the use of a bin including one function to selectively control the at least one connection means; wherein the at least one connection means is able selectively to raise and to lower the bin lid with respect to the closely located bin.

Preferably, the connection means includes an arm and one or more electronic control functions operative to raise or lower the arm.

The arm may be able to be placed into an engaged position with respect to the bin lid of a closely located bin, and a non-engaged position with respect to the bin lid, wherein when the arm in the engaged position is raised, the bin lid is raised, and when the arm in the engaged position is lowered, the bin lid is lowered The connection means may include a cable and one or more electronic control functions operate to extend or retract the cable.

Preferably, the arm is able to be placed into an engaged position with respect to the bin lid of a closely located bin, and a non-engaged position with respect to the bin lid, wherein when the cable in the engaged position is retracted, the bin lid is raised, and when the cable in the engaged position is extended, the bin lid is lowered.

The connection means may include an engaging element for engaging the lid of the bin.

The engaging element for engaging the lid of the bin may be a plate or arm for engaging an under-surface of the bin lid or bin handle.

The engaging element for engaging the lid of the bin is preferably a magnetic connector for engaging a metallic or magnet connected to the bin lid or bin handle.

According to a further aspect of the invention, there is provided a bin aid adapted to raise and lower a bin lid, the bin aid including: an arm moveably attached to main body, the arm being able to be raised and lowered with respect to the main body; one or more electronic control functions to operate the raising or lowering of the arm; the arm being able to be put into an engaged position with respect to the bin lid, and a non-engaged position with respect to the bin lid; wherein when the arm in the engaged position is raised the bin lid is raised, and when the arm in the engaged position is lowered, the bin lid is lowered.

According to an aspect of the invention, there is provided a bin aid adapted to raise and lower a plurality of bin lids, the bin aid including: a plurality of arms movably attached to a main body, the arms being able to be raised and lowered with respect to the main body; one or more electronic control functions to operate the raising or lowering of the plurality of arms; each arm is able to be put into an engaged position with respect to one of the bin lids, and a non-engaged position with respect to one of the bin lids; wherein when one of the arms is raised in the engaged position one of the bin lids is raised, and when one of the arms is lowered in the engaged position one of the bin lids is lowered.

The bin aid is separable from the bin and bin lid. The bin aid is preferably adapted to engage with a bin including one or more wheels, and said bin is preferably able to be wheeled away from the bin aid when the arm is in a non-engaged position with respect to the bin lid of said bin.

The bin aid is able to be retrofit to an existing bin and bin lid.

The bin aid may include at least two arms, and the main body may be centrally located such that one or more first side arms are movably attached to a first side of the main body, and one or more second side arms are movably attached to a second side of the main body, the second side being on the opposite side to the first side of the central main body.

Each arm attached to the main body is preferably adapted to engage with a bin lid via engagement means. The engagement means may be located towards an end of the arm.

The bin lid engagement means may include a magnet on an arm for magnetically engaging with a magnet attachable to a bin lid.

The magnet may be mounted on the arm. The magnet is preferably attachable to the bin lid by screwing the magnet into the bin lid.

The magnet on the arm may be tethered to the arm.

The bin lid engagement means may comprise a strip of material movable through a handle of the bin lid, the strip including a magnetic portion.

The bin lid engagement means may comprise a hook which is adapted to engage with a handle located on the upper surface of the bid lid.

The bin lid engagement means may comprise a push down locking member. The push down locking member may include a movable latch. The latch may comprise a movable jaw. The push down locking member may engage with the bin lid by receiving a downward force to move the movable latch or jaw inwards.

The arm may be extendable in length.

The bin aid may include a bin container engaging means. The bin container engaging means preferably engages with a rear portion of the bin container. The bin lid engagement means and the bin container engagement means may cooperatively engage with the bin.

Preferably, the bin aid includes a sensing means for sensing when the bin is a suitable location for the bin lid engagement means to engage with the bin lid. The sensing means is preferably able to sense when a bin engages with the bin container engaging means. The sensing means is preferably able to sense whether or not a bin lid engages with the bin lid engaging means (i.e. whether the arm is in the engaged or a disengaged position with respect to the bind lid).

The arm may be movable to a bin insertion position in which the arm is raised with respect to the main body. Preferably, the arm permits insertion of the bin into the bin container engaging means when the arm is in the bin insertion position.

The arm preferably moves automatically to the bin insertion position where the bin is not sensed by the bin sensing means and/or the bin lid engaging means sensor senses that the arm is in a disengaged position.

There may be a delay between automatically moving the arm into the bin insertion position after the arm is placed in a disengaged position.

A sound may be generated by the bin aid when the arms are raised or lowered. The sound may be generated where the arm is automatically raised after being placed in a disengaged position.

The arm may be placed in the engaged position when:
- the sensing means senses that the bin engages with the bin container engaging means; and
- the sensing means senses that the bin is in a suitable location for the bin lid engagement means to engage with the bin lid; or the bin has been inserted into the bin container engaging means.

The arm(s) may be placed in the disengaged position after they are in the engaged position.

Preferably the one or more electronic control functions include any one or combination of the following:

A remote control to operate the arm(s) remotely from the bin aid

A motion sensor to operate the arm(s) in response to motion detected by sensor

A foot switch to operate the arm(s) when a switch is activated by the foot of a user An override function which, when activated, maintains the arm(s) in either a raised or lowered state The bin aid may be free standing and include a base and intermediate section located between the main body and the base.

Preferably, the base includes a fillable chamber. The fillable chamber may be filled with sand, water, or other granular or fluid substances.

The bin aid may be adapted to be fixed to a separate structure to locate the arm(s) at a sufficient height above the bin lid(s), and to be at a sufficient distance from said separate structure, to enable the arm(s) of the bin aid to raise and lower the bin lid(s).

In a preferred form of the invention, at least one of the arm(s) is supported by one or more auxiliary base(s) which are spaced apart from each other and the base.

At least one of the arm(s) may be supported by one or more brackets adapted to be fixed to a separate structure. The separate structure may be the same structure to which the bin aid is adapted to be fixed.

Each arm is movable with respect to the main body between a raised position and a lowered position.

The main body may include a plurality of rotating bosses on each of the left and right sides of the main body, each rotating boss being attachable to a base of an arm, and able to raise and lower the arm by rotating with respect to the main body. The plurality of rotating bosses are preferably vertically spaced to permit locating an arm on a higher boss or a lower boss, according to height of the bin and bin lid which the arm is intended to raise and lower The arm(s) may be raised and lowered by an electric motor located in the main body. The electric motor is powered by a battery which is located in the main body, or elsewhere in or on the bin aid. The battery may be charged by a mains connection and/or solar panel. The solar panel may be located on a pole which extends from the main body.

The main body may include a battery charge display to indicate the amount of charge remains in the battery.

The arm(s) may be raised and lowered by an electric motor powered by a mains connection.

The main body may include a photocell for responding to ambient light.

The main body may include a temperature display

The bin aid may include a bin aid light to illuminate an area around the bin aid. When the light intensity is below a pre-determined threshold, the bin aid light may automatically turn on; and when the light intensity is above a pre-determined threshold, the bin aid light may automatically turn off The bin aid may include a bin light for illuminating the inside of a bin.

The bin aid may include a washer jet for spraying a liquid into a bin.

The liquid is preferably de-odourising. The liquid may have animal or insect deterring properties. The liquid may be stored in a refillable tank. Preferably, the refillable tank is located on the main body. The refillable tank preferably includes a liquid sensor to indicate when the liquid in the tank is low. The liquid sensor is electronically connected to an indicator able to indicate when the liquid in the tank is low.

When the bin lid engaging means is engaged, and the bin lid is raised, the bin aid is able to spray liquid into the bin via a liquid jet.

The bin aid is preferably electronically connected to an indicator able to indicate one or more of the following:

battery charge amount of liquid in the tank whether it is 'bin night'

The main body preferably includes a plurality of buttons, the plurality of buttons controlling one or more of the following actions:

turning the LED lights on or off keeping a lid open for a set time turning a sensor on or off turning power on or off The features described in relation to one or more aspects of the invention are to be understood as applicable to other aspects of the invention.

Advantageous Effects of Invention

Many advantages are achieved by the present invention, many of which will be well appreciated by a skilled person.

BRIEF DESCRIPTION OF THE DRAWINGS

Notwithstanding any other forms which may fall within the scope of the present invention, preferred embodiments of the invention will now be described, by way of example only, with reference to the accompanying drawings in which.

DETAILED DESCRIPTION OF THE PREFERRED EMBODIMENTS

A range of embodiments of a bin aid is shown by the Figures and is as described and depicted herein in connection with an illustrative but series of non-limiting preferred embodiments for a particular application.

Figure 1:
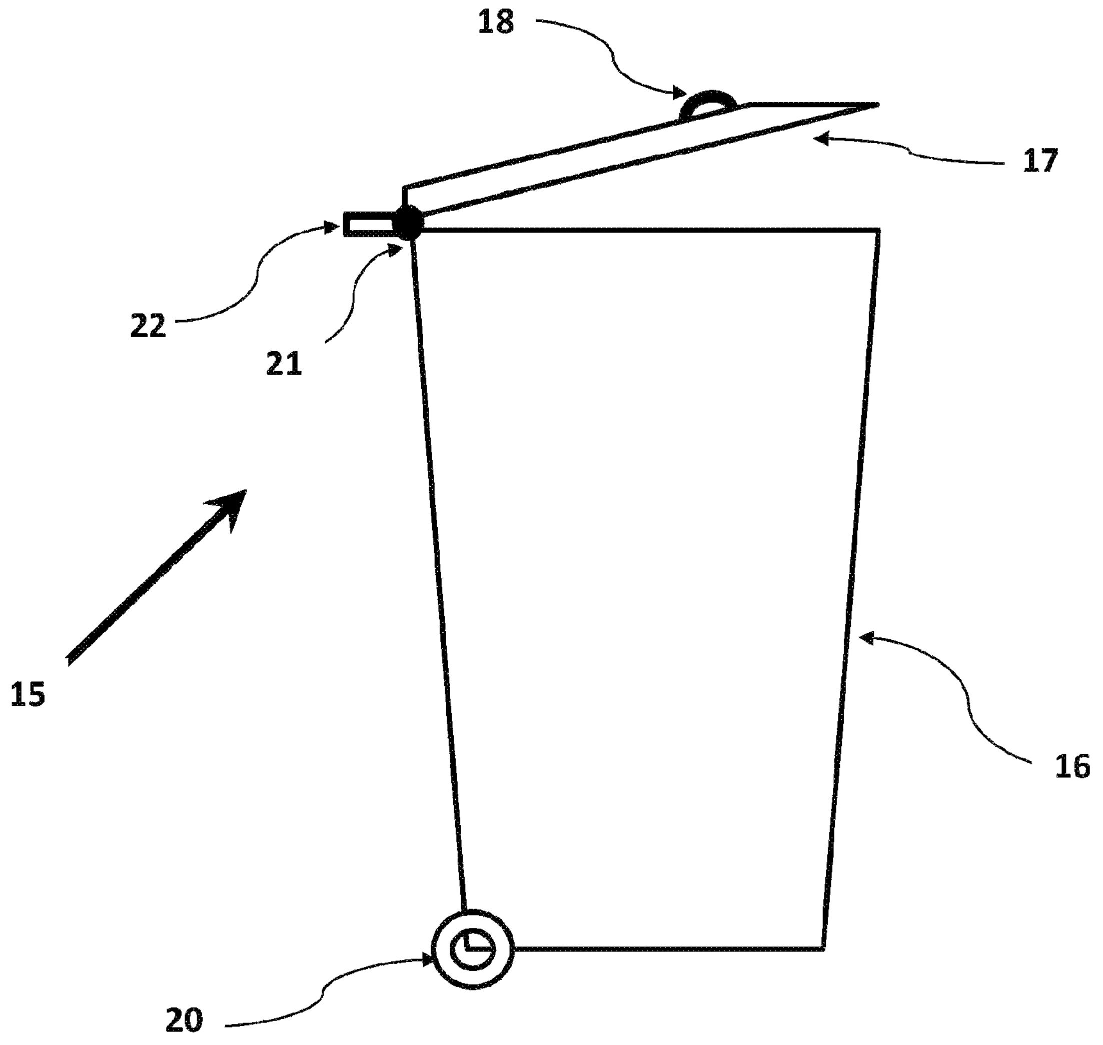
FIG. 1 is a schematic drawing of a wheelie bin for use with a bin aid according to preferred embodiments of the present invention.

As shown in FIG. 1 a bin for use with the bin aid of the invention, is commonly known as a "wheelie bin" 15 and comprises a base container 16 having a receiving internal volume and shaped with a generally quadrilateral vertical cross-sectional shape. The volume is primarily expanding horizontal rectangular shape from a smaller base to a wider open mouth top covered by a hinged closing lid 17. The hinge 21 supporting the hinged lid 17 is at a back top edge and from which extends in the opposite direction a handle 22. At the bottom corner beneath the handle 22 is a pair of wheels 20 on a single axle, which the bin 15 can pivot on by tugging the handle 22 and allowing the bin to be rolled into required position. Hence the derivation of the term "wheelie bin".

The structure, principle and operation of the described aid, as will be appreciated by those skilled in the art includes a structure adapted to aid the use of a closely located wheelie bin 15 including to raise and lower a bin lid 17 of the bin, the bin aid including: a main body; at least one connection means functionally connected with the main body 30 and able to functionally engage with a bin lid 17 of a closely located bin; a control means for controlling a plurality of functions to aid the use of a bin including one function to selectively control the at least one connection means; wherein the at least one connection means is able selectively to raise and to lower the bin lid with respect to the closely located bin.

Figure 2:
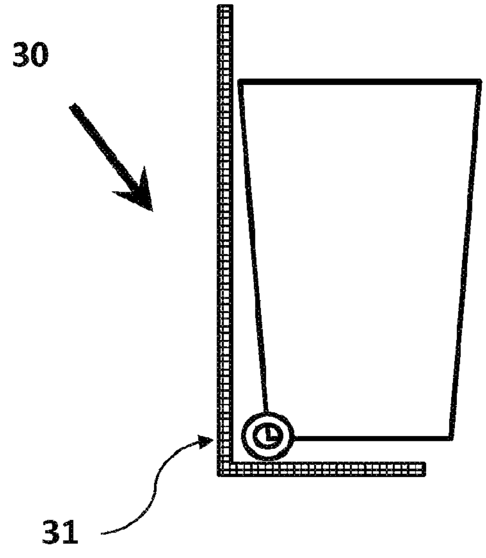
FIGS. 2 to 5 are schematic side views of a bin aid fixed to a separate structure according to four different preferred embodiments of the present invention.

The main body 30 of the bin aid can comprise various forms. In one form as shown in FIG. 2 the main body 31 is a fixed body which allows a wheelie bin 15 to be wheeled onto. This becomes a wheelie bin station.

Figure 3:
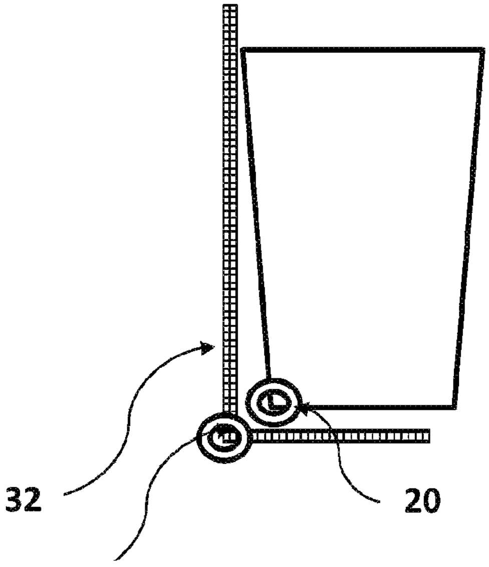

In another form as shown by FIG. 3, the main body can be a wheeled main body 32 and itself can have a supporting wheel 33 separate to the wheelie bin wheel 20 and therefore allow movement of the wheelie bin station to a required position and then locate the wheelie bin 15 in a closely located position.

Figure 4:
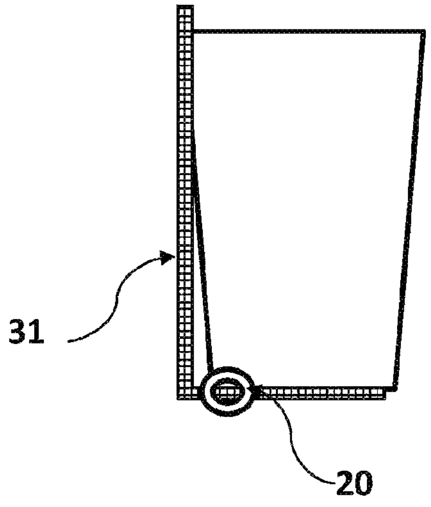
Figure 5:
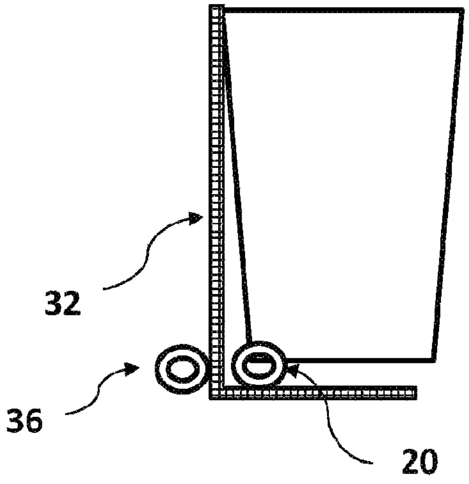

Referring to FIG. 4 the main body 34 can be integral with the wheelie bin 15 and therefore be transported on the wheels 20 of the wheelie bin.

A still further embodiment of the main body 31 that stands as a fixed wheelie bin station but can include a supporting wheel 36 which does not come into play until the wheelie bin station is tilted a certain amount. In this way the main body 35 forms a stable base until it has been suitably tilted to the moving wheeled position and form a wheeled main body 32.

Figure 6:
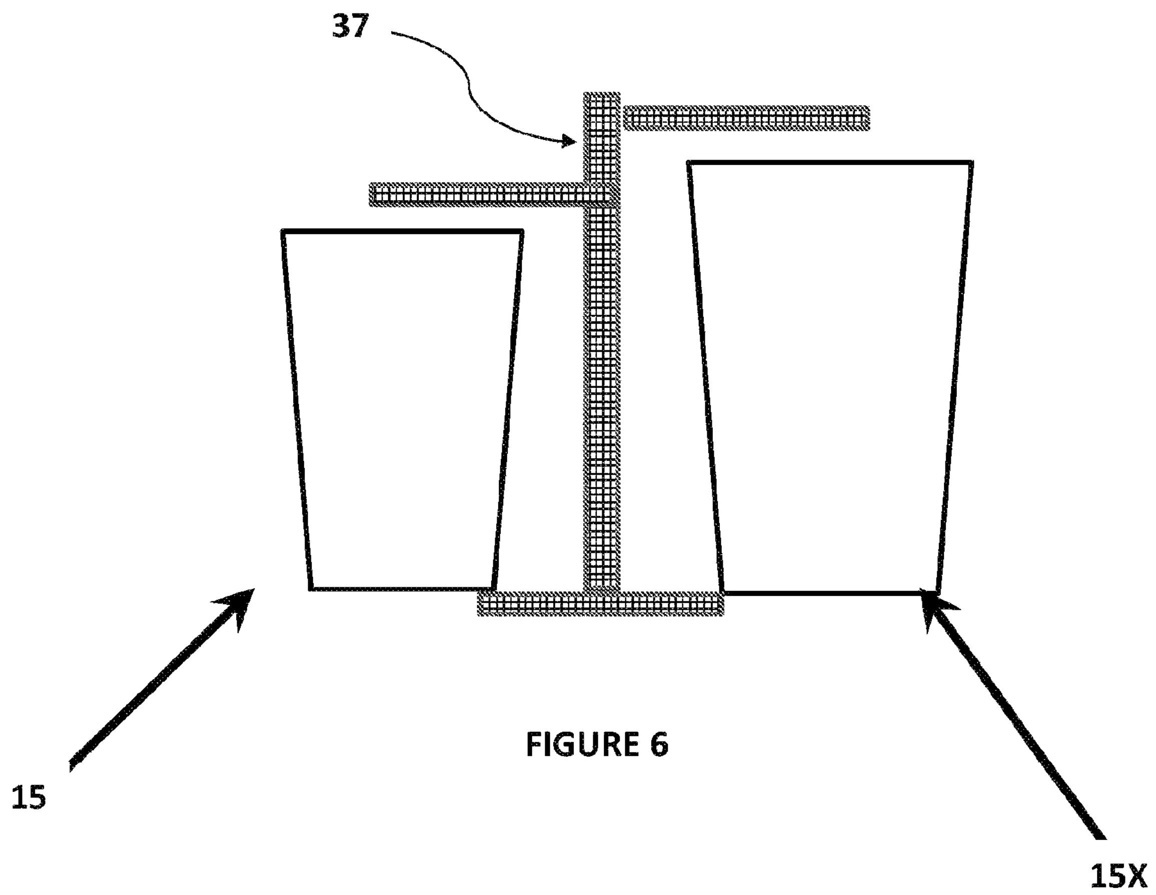
FIG. 6 is a schematic front view of a multi-station bin aid for use with two wheelie bins of different sizes according to a further preferred embodiment of the present invention.
Figure 7:
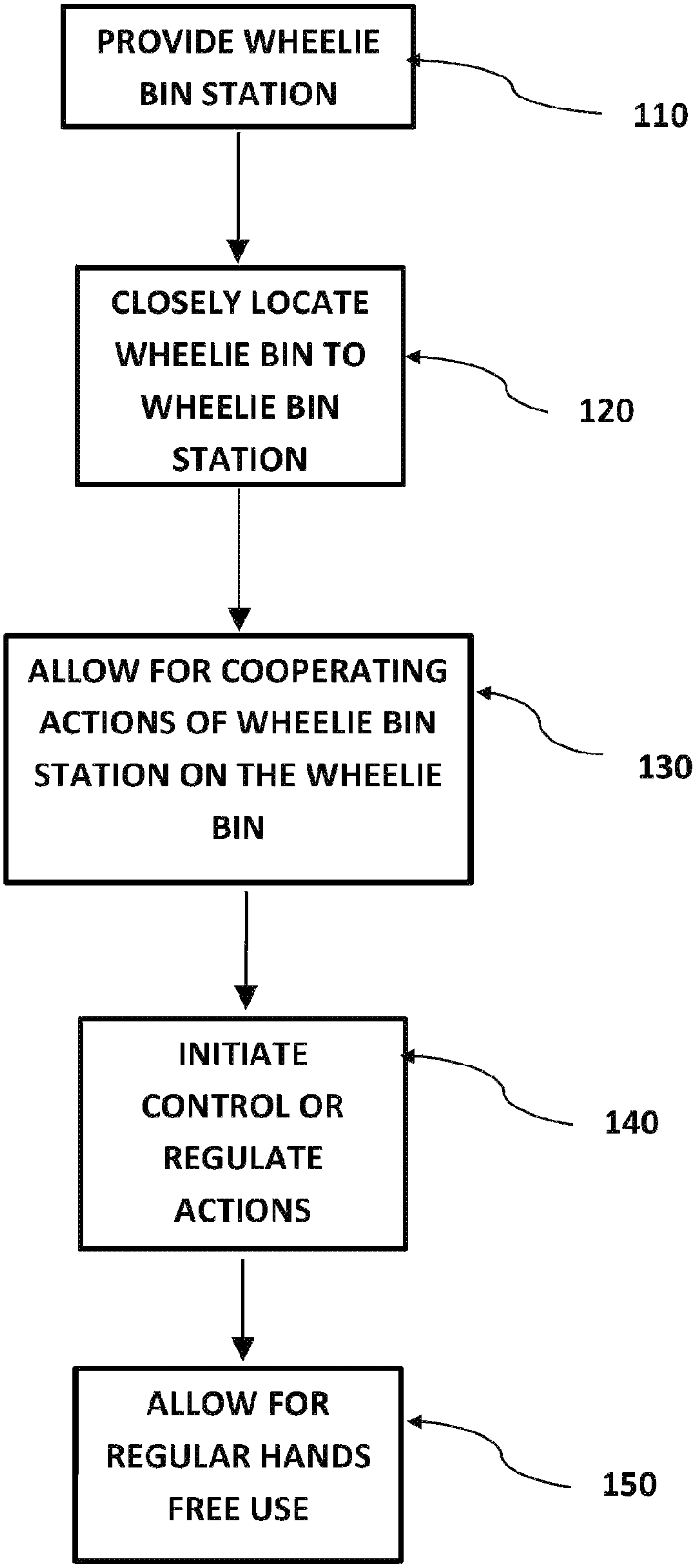
FIG. 7 is a diagrammatic flow diagram of the interactive use of a bin aid and a closely located wheelie bin according to a preferred embodiment of the present invention.

Referring to FIG. 6 there is a multi-station 37 able to coordinate with two bins 15 and 15X that can be different sizes. Often there is a tendency by Councils to encourage particular waste distribution rules. Therefore, the landfill general waste bin can be a smaller bin to the green waste or recyclable bin so as to encourage composting and recycling. The main body 37 is able to cater for either size. There can be adjustable of such a unit to allow multi-station use of two same sized bins whether large or small.

The main body 30 in its various forms can include a stabilising base 52. This can be a larger footprint base or a weight increase base so as to bring the centre of gravity of the bin aid to a substantially lower position and prevent accidental tipping. Such weight increase of base can be a water or sand filled base container or it can include a solid heavy base.

Referring to FIGS. 8 to 12 there are examples of a bin aid interaction to a bin lid of a closely located wheelie bin. In particular, an important interaction is the automatic raising of the lid 17 of the bin 15 by the arm 40 of the bin aid 30. The arm 40 can take various forms including those shown.

Figure 8:
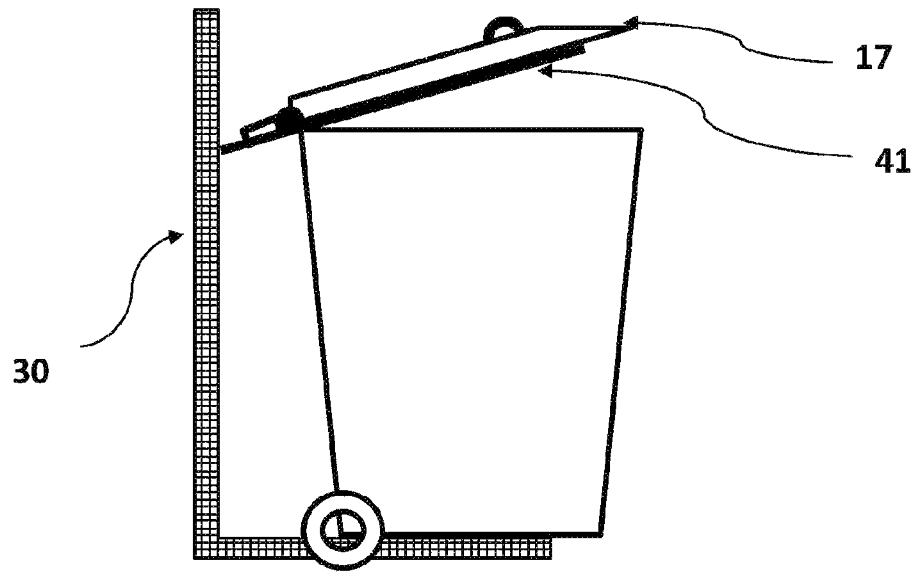
FIGS. 8 to 12 are schematic side views of a bin aid interaction to a bin lid of a closely located wheelie bin according to four different preferred embodiments of the present invention.
Figure 9:
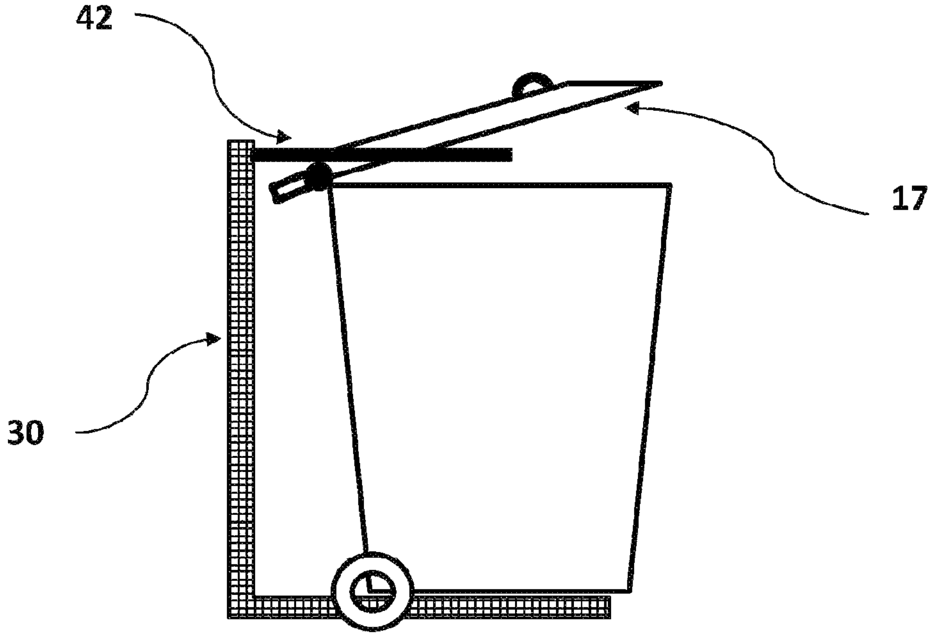

In FIG. 8 the arm 41 is pivotally attached to the main body 30 of the bin aid and can be driven by a drive motor in a circular manner around the pivot hinge of the arm 41. The arm 41 can extend between the lid 17 and body 16 of the bin 15 and therefore lift the lid 17 from underneath.

In FIG. 9 the arm 42 is again pivotally hinged to the main body 30 of the bin aid but the arm extends around the side so as to engage under the lid 17 at a distance from the hinging of the lid 17 to the body 16. This arm can extend across the body 16 of the bin and engage with a similar arm extending from the main body on the other side of the bin. In this way sideways distortion is avoided. Still further the arm 42 can have a crank shape so that the crank provides a strengthening portion at the far extremity of the arm 42 from the hinged connection to the main body.

Figure 10:
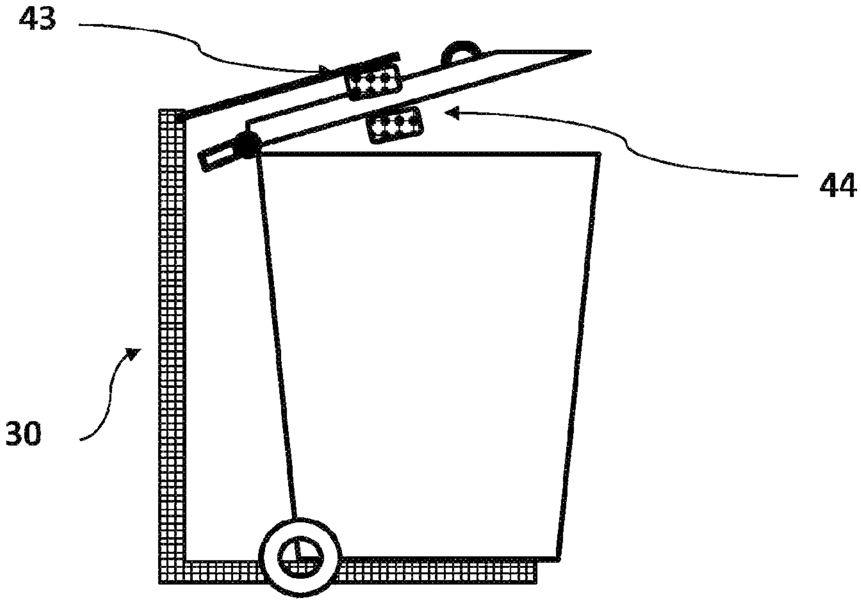

In FIG. 10 the arm 43 is hingedly connected to the main body and driven by a rotating motor. However, in this form the arm 43 extends over the top of the lid 17 and is connected to the lid. This can be done by detachable means such as a magnet at the end of the arm 43 that interacts with a complementary magnet 44 or steel plate mounted on the bin lid 17. In this way the lid 17 is lifted from above. This system can use a reel instead of a hinged arm at the connection with the main body such that letting out and retracting a flexible line connected to the magnet 44 will result in controlled opening and closing of the lid 17.

Figure 11:
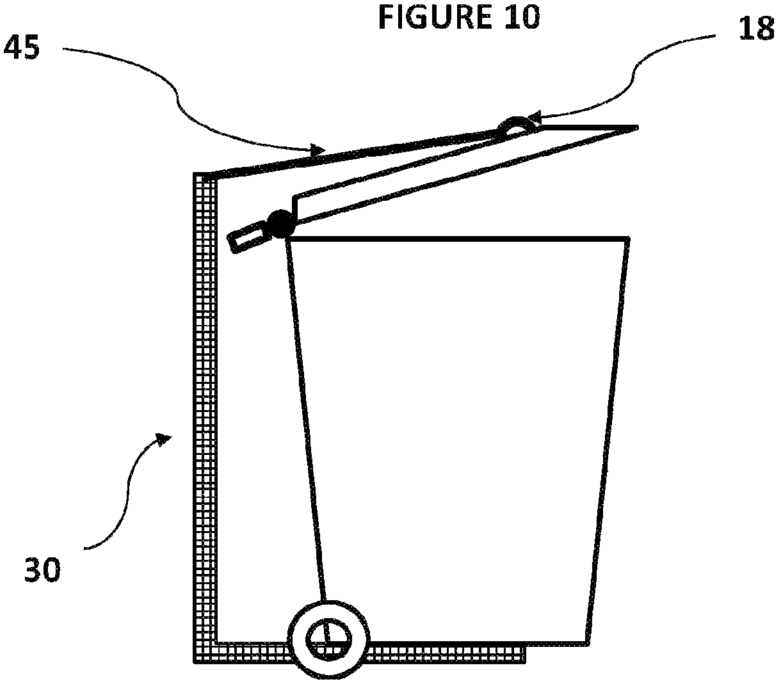

FIG. 11 shows an arm 45 that interacts and engages the handle 18 on top of the lid of the bin.

Figure 12:
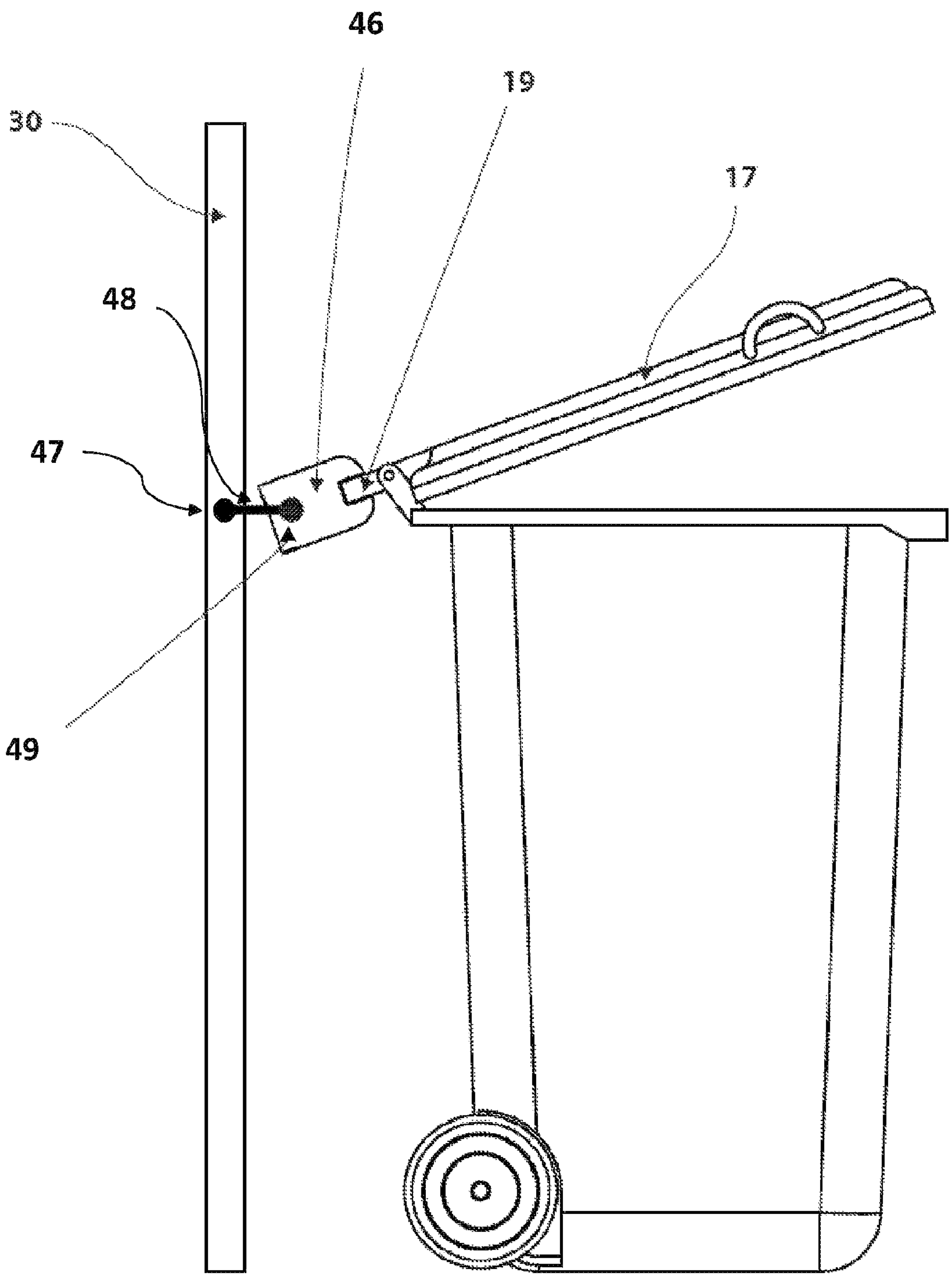
Figure 13:
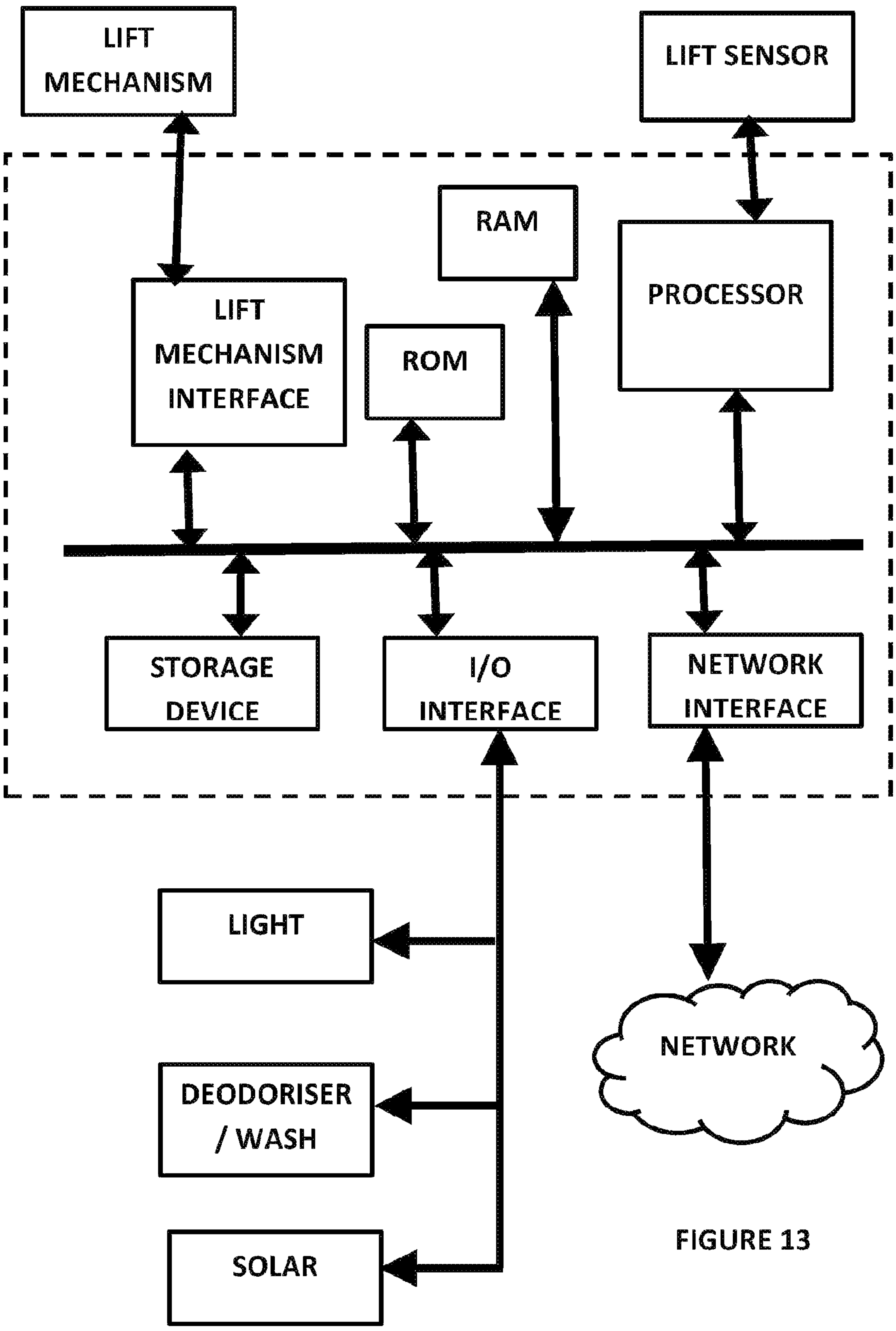
FIG. 13 is a schematic view of a control and communication system of a bin aid according to a preferred embodiment of the present invention.

FIG. 12 shows a rotatable unit 46 including a jaw for directly receiving the bin lid that can be mounted and can move a swing 85 attached to the handle 22 (as described later) or a rearward portion 19 extending rearwardly of the bin lid 17 on the other side of the bin lid pivot 21. Also depicted in FIG. 12 is translation element (or arm) 48 which can translate upwardly and downwardly, and which connects to the rotation means 49 for rotating the rotatable unit relative to the translation element 48. The translation element 48 is extendable (not shown) and is also connected to the pivot means 47 which permits pivoting of the translation element relative to the body 30. As will be understood by the person skilled in the art, the rotatable unit 30 is selectively controllable by the controller (not shown) to move downwardly via pivot means 47 and, as a result of the extension of the length of the translation element (also not shown), away from the post 30, to raise the bin lid; and the rotatable unit 30 is able to move upwardly and, as a result of a reduction in the length of the translation element, towards the post 30, to close the bin lid. The rotation means 49 and pivoting means 47 comprise electrically controlled gears and pinions situated on the rotatable element and the post (not show). Alternatively, the rotation or pivoting means may comprise other mechanisms or components known to the skilled addressee.

Opening Means—Preferably opening means will be automatic so as to allow hands free operation off the opening of the lid 17 of the bin 16 when the user's hands are full with rubbish to be placed into the bin.

1—Where there are multiple bins, each will have a control unit that it will be attached to. There will be one master control unit with all of the controls in it, for each house to control their rubbish bin, there are too many houses that has only one bin so those houses only needs a master unit. If the house or premises has more than one bin, therefore will need one master unit and a unit that the bin will be attached to but this unit will do whatever the master unit tells it to do. the master unit will be dominant to the slave unit. They will look the same but operate differently. There can be hard wiring that will go from master unit to the slave units to be able to control them. However, in another form there can be electronic connection like Wi-Fi or Bluetooth.

2—The bin attachments can interlock with the master and slave units. In this way you can have multiple bins or be in an apartment with multiple bin users and other options.

3—options can include the ability to remove the bins from the units or vice versa so that not only is there retrofitting possible but reversal of the retrofitting. This is often important when users move locations and the bin remains council property and is retained on the existing property.

A—Remote control—A user's foot can enable opening of the lids by engaging the right slipper and the user's left foot can release the bin from the main unit for 10 minutes. If the bin is not removed, it will lock again. If it is your day to take the bins out, and you are inside the house, with the rubbish and recycle bags in your hand you just have to step on the right slipper to open the lids and left slipper to release the bins so after you put the trash in the bins and the bins are closed, then you can pull the bins out from the units.

B—Wi-fi connection—when a user comes home from work, normally they want to take the bins out so when they go inside the house, they don't want to come out again. There is provided an application on a personal electronic device so that the use can connect to the bins through their wi-fi and release the bins from the master unit or the slave units and whichever they don't remove will lock again after 10 minutes or it will be adjustable so a suited time is programmed.

Example 1

Referring to FIGS. 13 to 16 there is shown a bin aid with a main body 30 in its various forms can include a stabilising base 52. This can be a larger footprint base or a weight increase base so as to bring the centre of gravity of the bin aid to a substantially lower position and prevent accidental tipping.

The main body includes a leg portion 51 mounted on the stabilising base 52 and supporting a middle-elongated section 53 and a colinear top extension portion 54 supporting a solar panel 55. The bin aid is elongated and upright so as to coextend next to a bin. It can operate without a separate supporting main body 30 as that function is built in particularly with the supporting base 52.

Connected to and on either side of the main middle elongated section 53 are two arms 42 that are at different heights so as to overly different height bins such as shown in FIG. 6. The arms tip where will land on the bins and have a set of strong magnets 61 and where they land the lids will have a round big headed self-tapped screw. The consumer just screws the self-tapped screws into the bins. The attachable magnets will be able to be screwed to the end of the arms which will land on the lid when the arms go down.

Figure 15:
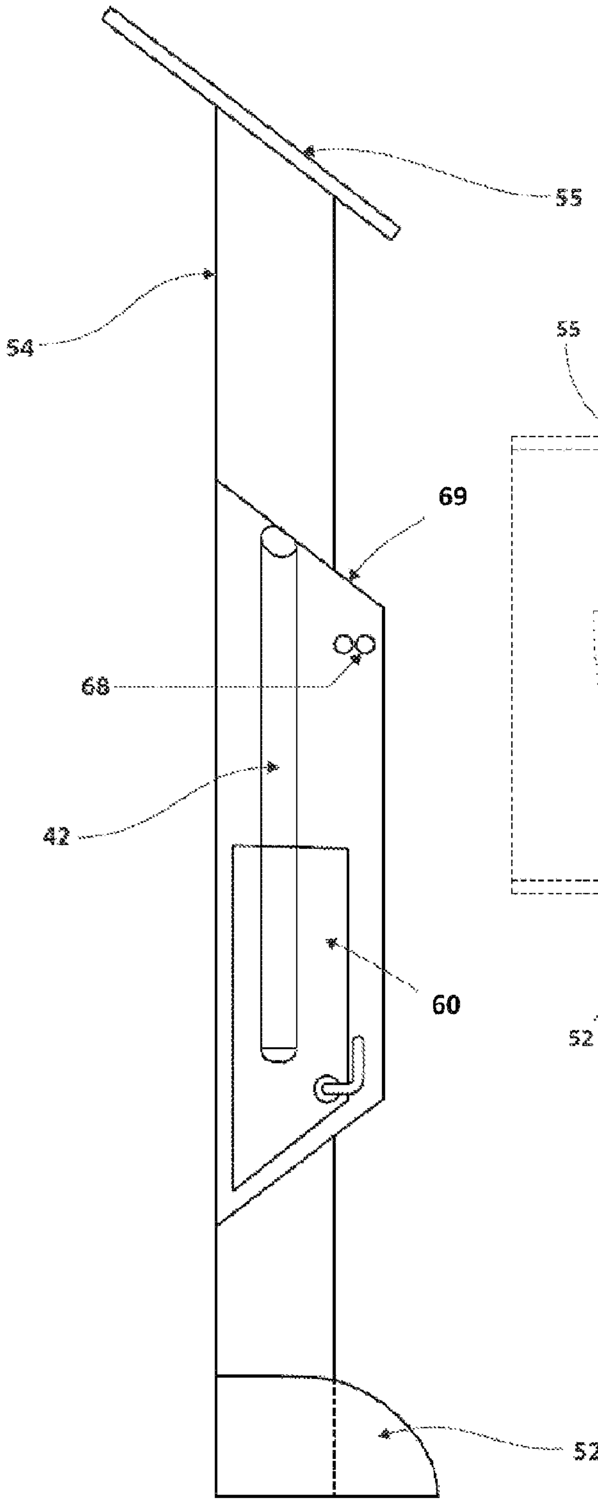
Figure 16:
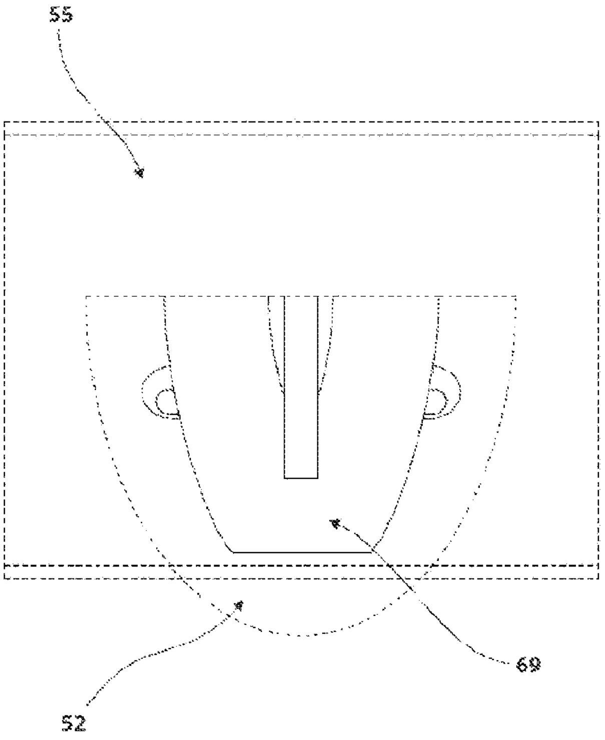

As shown in FIG. 15 there is located on top and bottom of the body some night lights 69. The bin aid can have an optional night light which will work with the photocell sensor 67. It will go on when its dark and off with sunrise. It will operate with on and off switch as required. Useful for very dark areas.

Further the bin aids can include a deodorant+washer unit 60 built into the body 53 and having a specialised 2 litre liquid chamber, which will hold chemicals that will make deodorise the bins, improve smell and keep the flies and birds away. This liquid will last about 6 months. The body has two water jets 68 on either side of an LED spot light and below a water temperature gauge 61 that monitors washing liquid temperature.

Figure 14:
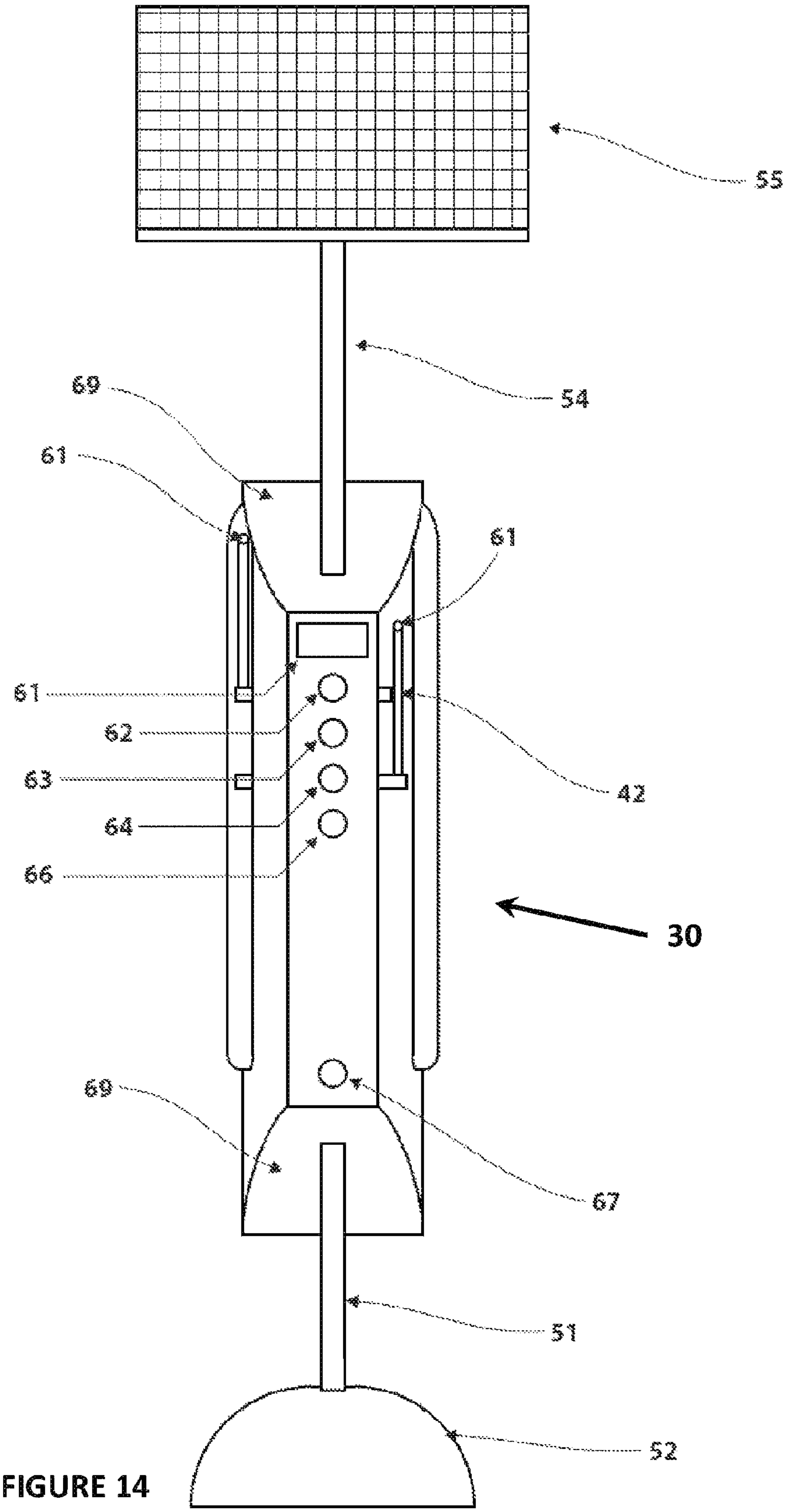
FIGS. 14, 15 and 16 are schematic front view, side view and top view of a first example of a bin aid according to a particularly preferred embodiment of the invention.

Referring to FIG. 14 there are controls on the front of the main body. This includes switches comprising of:

Water tank empty indicator 62

LED lights on/off 63

Lid open on/off 64

Sensor on/off 65

Main power on/off key 66

It can be seen that this version of bin aid is self-sufficient and a standalone product. It includes solar panel so as to be self-powering and apart from rare filling of the water tank can stay operational for months without maintenance or resetting. It is this continual action for a continual daily problem of bins that provides one substantial advantage to the users.

Example 2

Figure 17A:
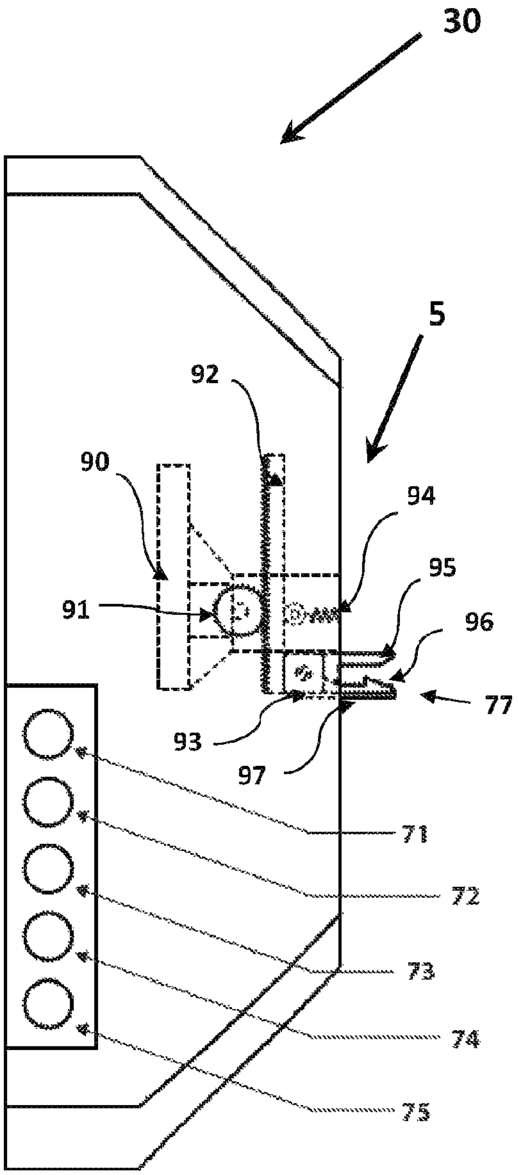
FIGS. 17A, 17B and 18 are schematic side views and top view of a second example of a bin aid according to a particularly preferred embodiment of the invention.
Figure 17B:
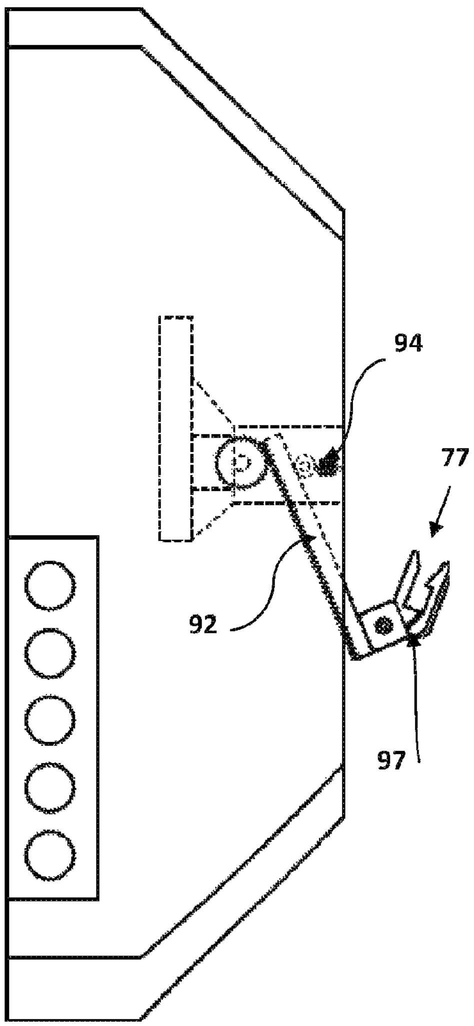
Figure 18:
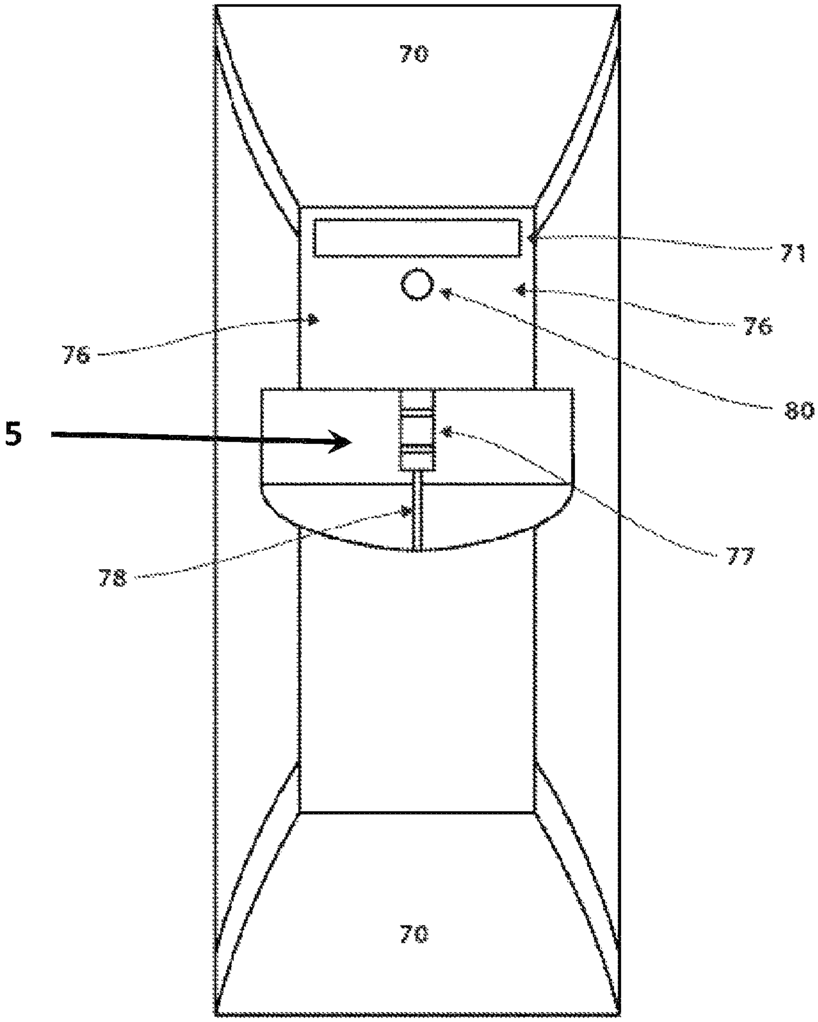

Referring to FIGS. 17A, 17B and 18 there is shown a body 30 including optional controls on the side of the main body. This allows the front of the main body to be away from the optional controls and therefore the water jets are away from the controls. This lessens the need for waterproofing electronics beyond splash protection. It also allows for front latch means comprising a jaw 77 for bin attachments to be mounted and a rubber slot 78 for the latch slide groove to allow the latch means (jaw) to move up and down.

The body 30 includes mounting means 90 for mounting the connection means to the body. The connection means comprises rotatable unit 77, translation element comprising shaft 92, drive unit which in the present embodiment comprises the pinion 91 and spring means 94, and a bin lid engaging element (not shown). The drive unit further operates to translate the shaft of translation element 92 and enable pivoting of the shaft of the translation element with respect to the body 30.

The pinion 91 comprises a circular gear adapted to engage with linear gear on the rearward side of the drive shaft 92. The pinion is able to be selectively controlled by the control means to rotate the pinion in a clockwise direction to translate the shaft 92 downwards, and to rotate to pinion in a counter-clockwise direction to translate the shaft 92 upwards with respect to the body. When the rotatable unit 77 is functionally connected to a bin lid (e.g. by bin lid engaging element, not shown) it is able to raise and lower the bin lid.

In more detail, the upper jaw 95 moves upwardly away from the lower jaw 96 to receive the swing of the bin lid engaging element (not shown). Once the swing has been received, the upper jaw 95, due to a spring loaded bias, then moves towards the lower jaw 96 to lock the swing together with the receiving means (i.e. the upper and lower jaws, 95, 96) of the rotatable unit 77.

Once the rotatable unit 77 has received the swing, the pinion may be selectively controlled to rotate in a clockwise direction to lower the shaft 92. As the shaft 92 is lowered, it brings the swing downwardly. As the swing moves downwardly, it together with the rotatable unit 77, rotate relative to the shaft 92. Additionally, as the swing moves downwardly, it will also move (together with the shaft 92 and rotatable unit 77) outwardly from the body 30 and inwardly toward the bin (not shown). This movement of the shaft and rotatable unit is permitted by spring means 94 that includes roller which rolls along the shaft and provides spring loaded resistance in a horizontal direction against the translation element in operation. The spring means is able to contract (see FIG. 17B) to permit the shaft 92 to pivot (or rotate) with respect to the body 30 when the rotatable unit/swing has completed its translation and rotation as depicted in FIG. 17B and has raised the bin lid (not shown). It will be appreciated that the rotatable unit can rotate relative to the shaft by jaw holder 97 which holds the upper and lower jaws 95, 96, since the jaw holder is pivotably connected to the housing 93 that is attached to the shaft 92. In FIG. 17B the jaw holder and jaws 95, 96 are at an acute angle relative to the shaft such that the jaws 95, 96 can pull down the swing.

The pinion may be also be selectively controlled to rotate in a counter-clockwise direction to translate the shaft 92 upwardly. As the shaft 92 is moved upwardly relative to the body 30, it translates the swing upwardly. As the swing moves upwardly, it together with the rotatable unit 77, rotates relative to the shaft 92. Additionally, as the swing moves upwardly, it will also move (together with the shaft 92 and rotatable unit 77) inwardly to the body 30 and outwardly from the bin (not shown). This movement of the shaft and rotatable unit is permitted by spring means 94 that includes a roller which rolls along the shaft and provides spring loaded resistance in a horizontal direction against the translation element in operation. The spring means is able to expand (see FIG. 17A) when the shaft 92 to pivots (or rotates) towards a vertical orientation when the rotatable unit/swing moves towards its initial position as depicted in FIG. 17A. In this initial position it will be understood that the connection means 5 may be functionally connected or disconnected from the bin (not shown) by the engagement or disengagement of the receiving means (i.e. movable jaws 95, 96) with the swing. In FIG. 17A the jaw holder 97 and jaws 95, 96 are approximately perpendicular relative to the shaft 92.

The weight of the bin 15 keeps the body of the bin 16 relatively stable and in the one location. However, stabilising means (not shown) can be provided to receive the wheels 20 or another part of the bin to further stabilise the bin 15 as the connection means is controlled to raise and lower the bin lid 17.

The side controls include switches comprising of:

LED lights on/off 71

Lid open on/off 72

Sensor on/off 73

Shock sensor on/off 74

Main power on/off key 75

As shown in FIG. 18 there is located on top and bottom of the body some night lights 70. The bin aid can have an optional night light which will work with the photocell sensor 73. It will go on when its dark and off with sunrise. It will operate with on and off switch as required. Useful for very dark areas.

Further the bin aids can include a deodorant+washer unit built into the body and having a specialised 2 litre liquid chamber, which will hold chemicals that will make deodorise the bins, improve smell and keep the flies and birds away. This liquid will last about 6 months. The body has two water jets 76 on either side of an LED spot light 80 and below a water temperature gauge 71 that monitors washing liquid temperature.

Pre-set time 3 am (the time will be locked into a convenient non-use time). When the bins are emptied and put back in position the bin lids will open overnight at 3 am by the timer and spray the deodorant into each bin for 2 seconds. First one bin then the other, then close the lid, if the bin is not in the position will not spray. The user will activate the function with the switch as required. The red light will stay on with the EMPTY writing, as the water is low in the tank. The motor will not work if the tank is empty.

Example 3

Figure 19:
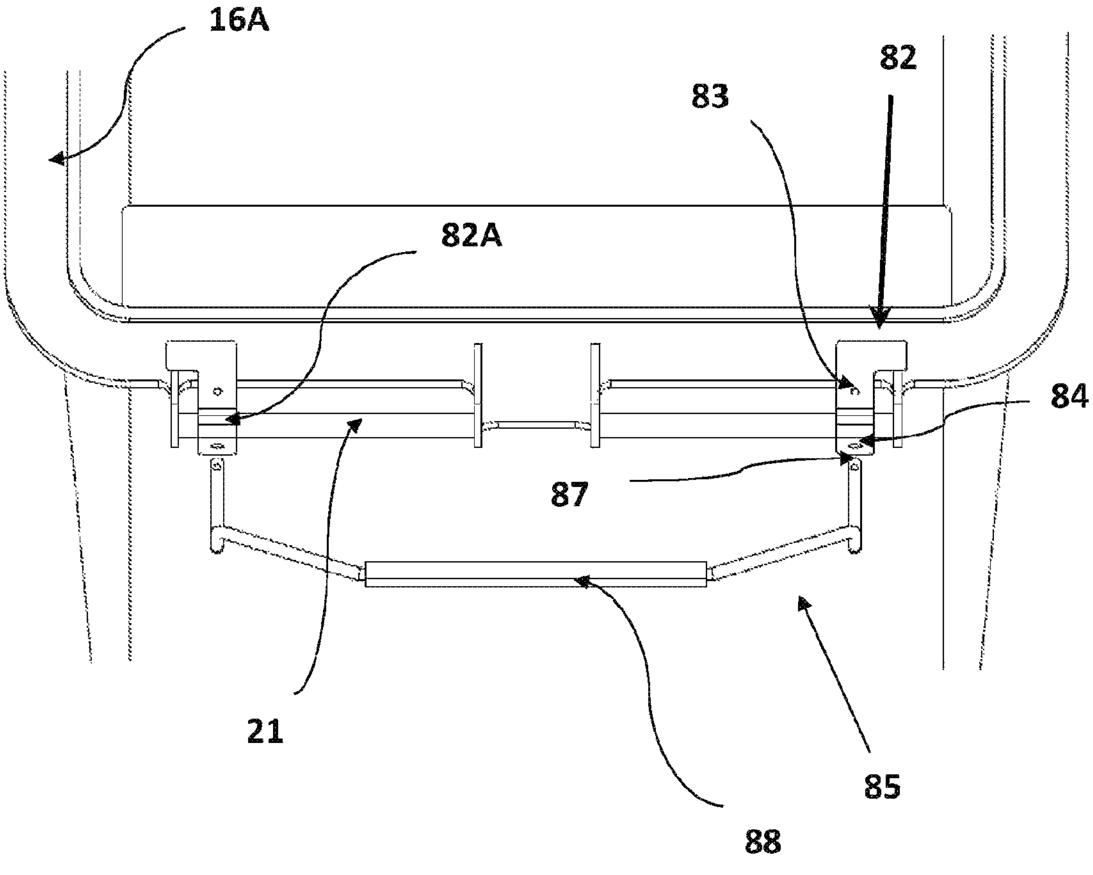
FIGS. 19, 20 and 21 are schematic top views of a third example of a bin engaging element of a bin aid according to a particularly preferred embodiment of the invention.
Figure 20:
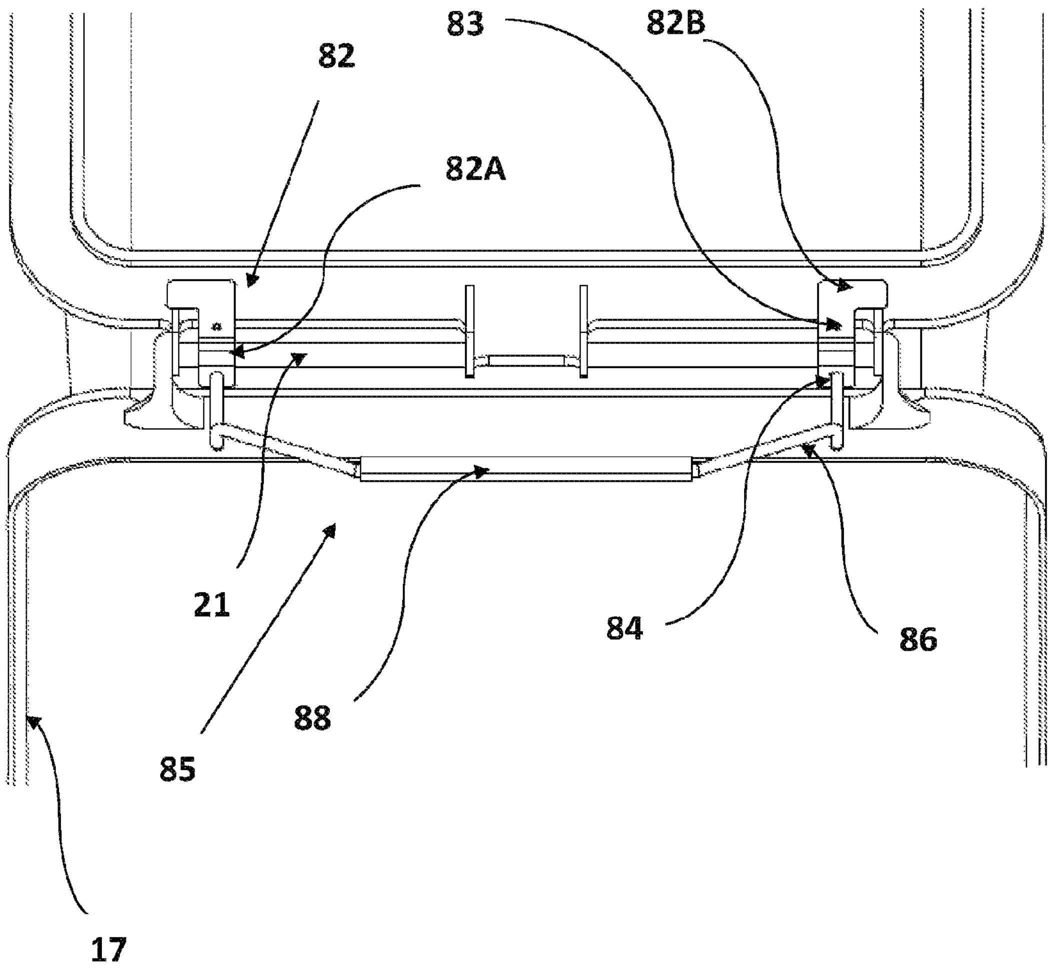
Figure 21:
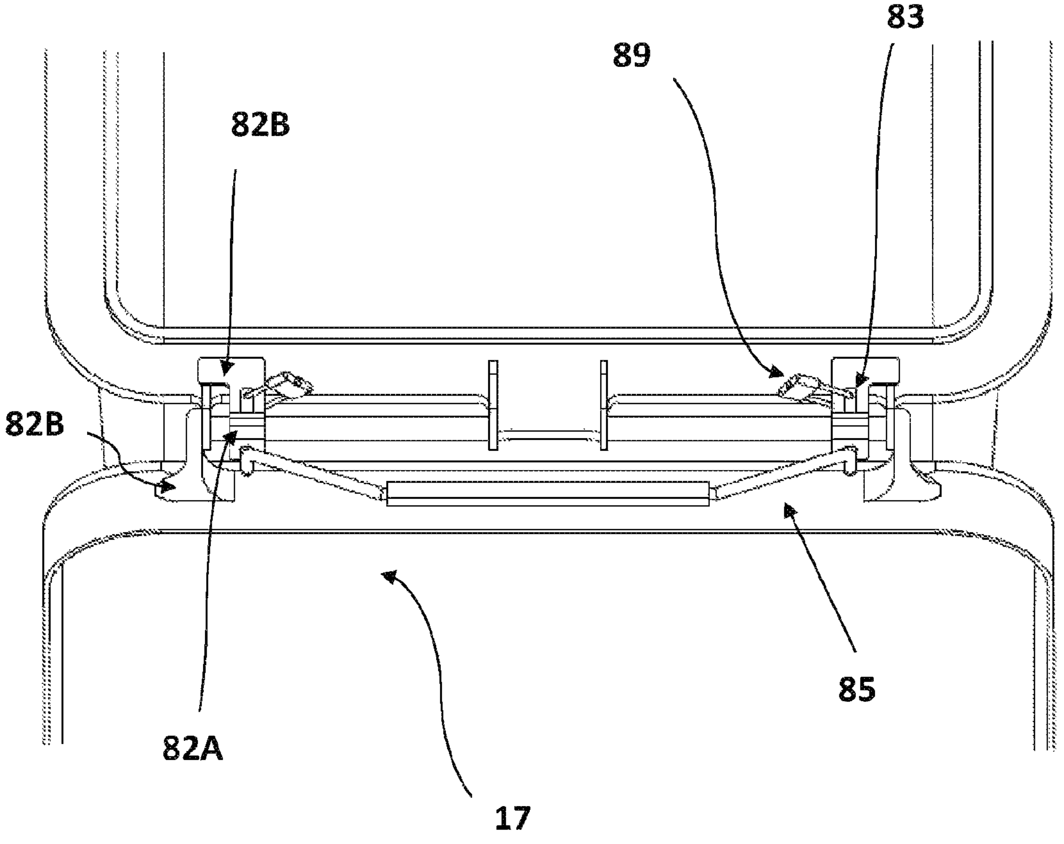

Referring to FIGS. 19 to 21, the bin lids attachments or bin lid engaging elements can in one embodiment for a household bin include a number of pieces. It can be adjusted to fit the bin,—whether it is small or big. The parts of the attachments include a swing 85 with arms 86, two lifters 82, and securing means to secure the swing to the lifters (e.g. using two Locks 89). It should be noted that the bin lid 17 is depicted in FIGS. 20 and 21 but is not depicted in FIG. 19.

The swing 85 has a functionally significant role for the automated bin opener embodiment depicted in FIGS. 19 to 21. The swing 85 is a bar that in use extends across the width of the bin 16 and ends in two arms 86 that protrude inwardly towards the bin. The bar portion of the swing can angle outwardly from the bin but has a central rectangular or non-circular cross section central bar portion 88. This non-circular cross section allows for ready gripping by a rotating means. The width of the bin engaging element may be extended or reduced by adjusting the length of the arms 86 which have the ability to recede into recesses in the swing 85 (not shown). Alternatively, the arms 86 may include telescoping parts, or other components known to the skilled addressee to permit the adjusting of their length.

The swing 85 is held in position by lifters 82 that provide for the positioning of the swing and the lifting of the bin lid.

The positioning of the swing 85 is achieved by the lifter 82 having two shaped connected parts 82A, 82B. At one end is an inverted U shaped part 82A with one longer arm that fits over the bin handle 22 and has the longer arm extending below the handle 22. The other shaped part 82B at the other end, called a lifting element, is a flat plate section that extends rectilinearly from the inverted U-shaped part 82A so as to reach and to overly the rim of the bin 16.

The length of the swing 85 will be adjustable laterally to change according to the bin width size. The lifters 82 length and height will vary according to bin shape.

There are two holes 83, 84 on each lifter 82—one hole 84 is in the one longer arm of the inverted U shape of the lifter. This hole on the front is for the arm 86 of the swing 85 to extend therethrough and underneath the handle so as to encapsulate the handle while still allowing the swing 85 to rotate around the handle 22. The other hole 83 is on the flat portion of the lifter 82 and in position is between the handle and the rim of the bin for receiving the shackle of the locks 89.

There is one hole 87 on each end of the arms 86 of the Swing 85. When the Swing 85 engages with the lifters during installation, the arms 86 extend through the hole 84 of the curved portion of the lifter 82 and the hole in the end of the arm 86 is pushed in until it underfits and aligns with the holes 83 on the flat portion of the lifter attached to the top of the bin 16. This is locked in position by the locks 89.

The swing 85 and the holes on the lifters 82 will line up so the consumer can attach the locks 89 to secure them onto the bins 16. There are two locks for every bin and both locks can have the same key but different set of keys from other bins. The locks will engage with the Swing and the lifter to hold them together.

It can be seen that after fulfilling this clean retrofit the lid 17 can readily rotate and overly the flat part of the lifters 82 that overly the rim of the bin 16A. Every bin, no matter what size and height, will have 2 lifters 82 at either end of the bin handle 22. The left lifter will sit on the left side of the bin handle and underneath the left, back corner of the lid. The right lifter will sit on the right side of the bin handle and underneath the right, back corner of the lid.

Figure 22:
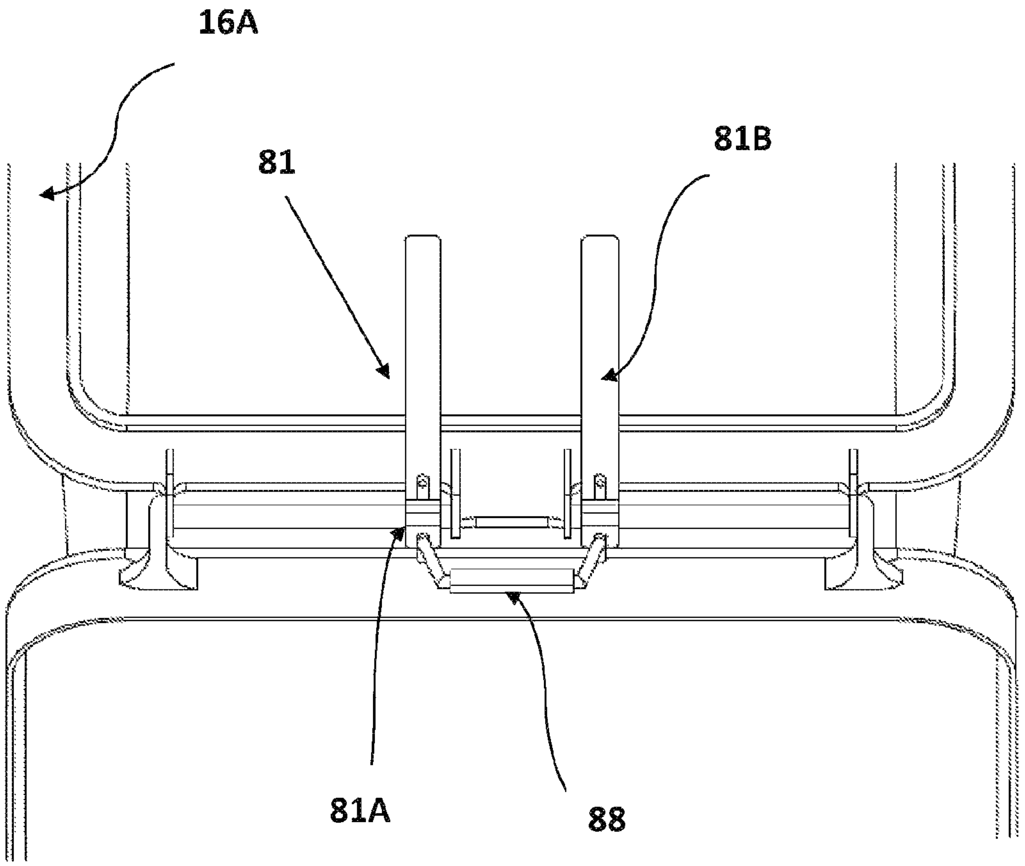
FIG. 22 is a schematic top view of a fourth example of a bin engaging element of a bin aid example.

As shown diagrammatically in FIGS. 17A, 17B and 19 to 21, the way the lifters 82 will work, when the central part of the swing 88 is pushed down by the main unit, the lifting element 82B, overlying the rim of the bin 16A and underlying the lid, will rise up and will lift the bin lids upward. In particular, the winged section of the lifting element 82B pushes against a part of the hinge of the bin lid 17, which hinged part of the bin lid 17 is robust and resistant to the forces exerted on it by the winged section of the lifting element 82B. With reference to FIG. 22, which depicts a further preferred embodiment of bin a lid engaging element, it may similarly be understood that the elongated lifting element 81B of the lifters 81 apply a force to the underside of the bin lid to raise the bin lid upward. In reverse the central part of the swing 88 is pushed upward by the main unit the lifters 82 and the lid 17 will return to overly the bin or if the bins are full and overflowing, the lifters will sit back to their position and the lid will stay on the top part of the rubbish bin. Similarly, with reference to FIG. 22, the elongated lifting element 81B of the lifters 81 is lowered when the swing 88 is pushed upwardly, and as the lifters return to rest on the rim of the bin 16A the bin lid 17 is lowered to seal the bin.

It will be understood that the bin lid engaging elements comprising the swing 85, lifters 81, 82, and arms 86, and in particular U shaped parts 82A, 81A are adapted to pivot upon the handle of the bin. In particular, the U shaped part has a complementary fit with the bin handle 21.

Figure 23:
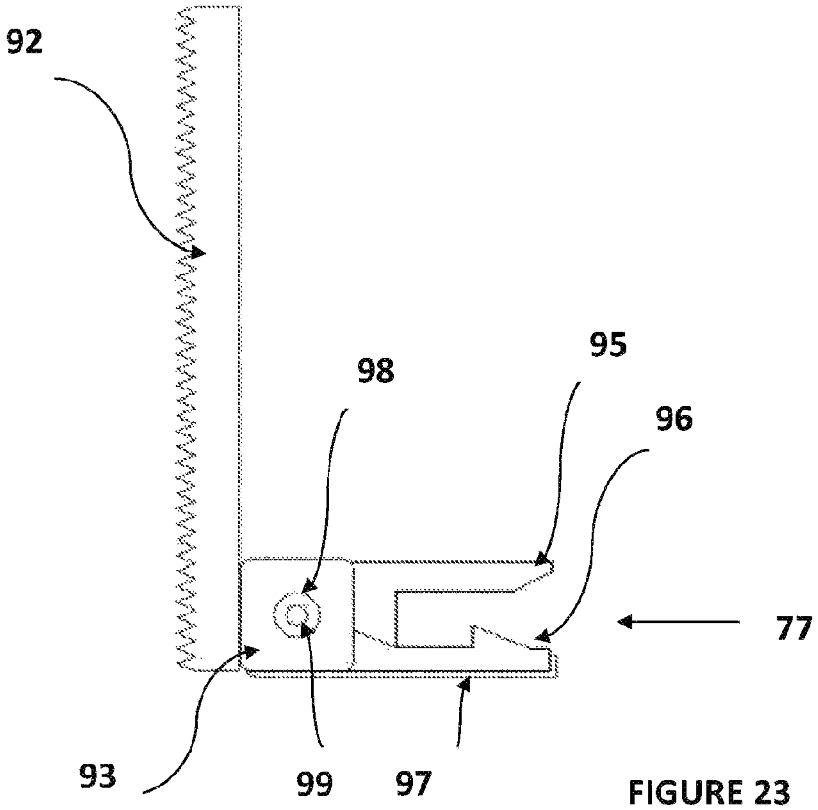
FIG. 23 is a schematic side view of an embodiment of a rotatable unit and connected translation element

Having regard to FIG. 23, there is shown a rotatable unit 77 comprising a receiving means for receiving a swing (not shown) that includes the upper jaw part 95 and lower jaw part 96 that sit within the jaw holder 97. The jaw holder 97 is able to rotate with respect to the shaft 92 via a rotating means including outer pin 98 and housing 93. The upper and lower jaw part 95, 96 and jaw holder 97 are adapted to pivot as a block with respect to the housing 93 that is connected to shaft 92. Additionally, the upper jaw is spring loaded (not shown) and able to move relative to the lower jaw by pivoting on inner pin 99. The upper jaw 95 is able to move to open and receive the bin lid engaging element (not shown), against the resistance provide by the spring loaded mechanism that is biased to return the upper 95 jaw to the default state as shown in FIG. 23. The upper 95 and lower jaw 96, when in the default state, form an incomplete rectangular shape which is complementary in shape to the outer surface of a rectangular cross-section swing (not shown), such that the jaw is able to lock together with the swing and the swing and jaw are able to rotate together.

With reference to FIGS. 17A and 17B, it can be seen that the jaw holder 97 is able to rotate with respect to the shaft 92. In use, where the jaw parts 95, 96 are locked together with the bin lid engaging element, they will rotate together as they are translated (e.g. downwardly to raise the bin lid).

Figure 24:
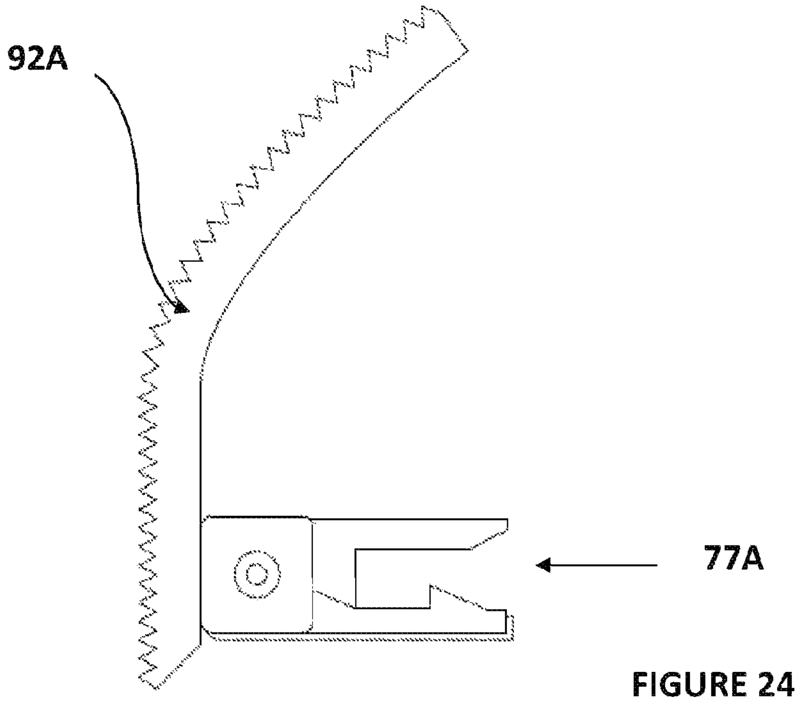
FIG. 24 is a schematic side view of a second embodiment of a rotatable unit and connected translation element.

Reference is now made to FIG. 24, which shows an embodiment of a rotatable unit 77A that is substantially the same as the embodiment of the referred rotatable unit 77 depicted in FIG. 23, except that rather than having a straight shaft it has curved shaft 92A. Having reference to FIGS. 17A and 17B, which depict an arrangement that permits inward and outward translation of the shaft 92 with respect to the body 30 by use of spring means 94, it will be understood the shaft 92A may be used as an alternative to shaft 92 and achieve the same movement of the rotatable unit 77 without the need for spring means 94.

Figure 25:
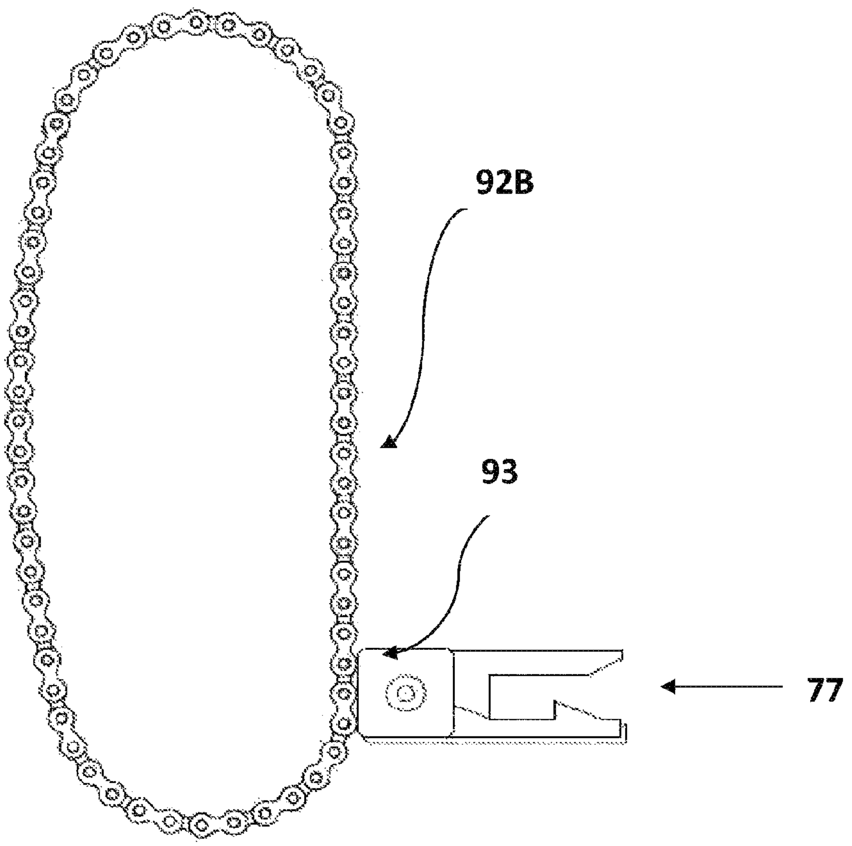
FIG. 25 is a schematic side view of a third embodiment of rotatable unit and connected translation element.

With reference to FIG. 25, there is depicted a rotatable unit 77 connected to a translation element comprising a chain 92B. The chain elements in the chain are able to be translated downwardly or upwardly for selectively raising or lowering the rotatable unit (not shown). With reference to FIGS. 17A and 17B, it will be understood by the skilled addressee that there may be provided a plurality of gear within the body 30 (in place of the pinion 91) to interconnect with the chain and translate the chain elements and thereby the rotatable unit 77 which is connected in a fixed manner to the chain via housing 93.

Figure 26:
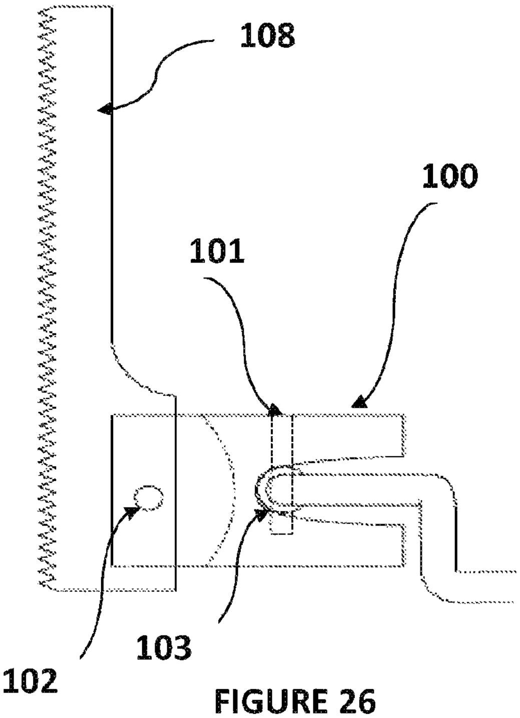
FIGS. 26 to 29 are schematic side and perspective views of a fourth embodiment of rotatable unit and connected translation element.
Figure 27:
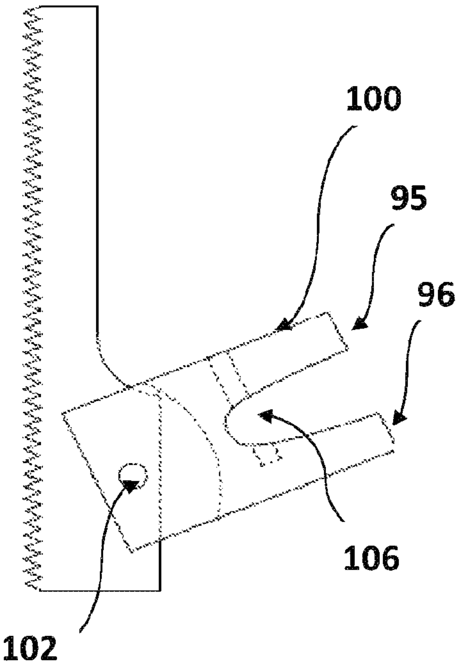
Figure 28:
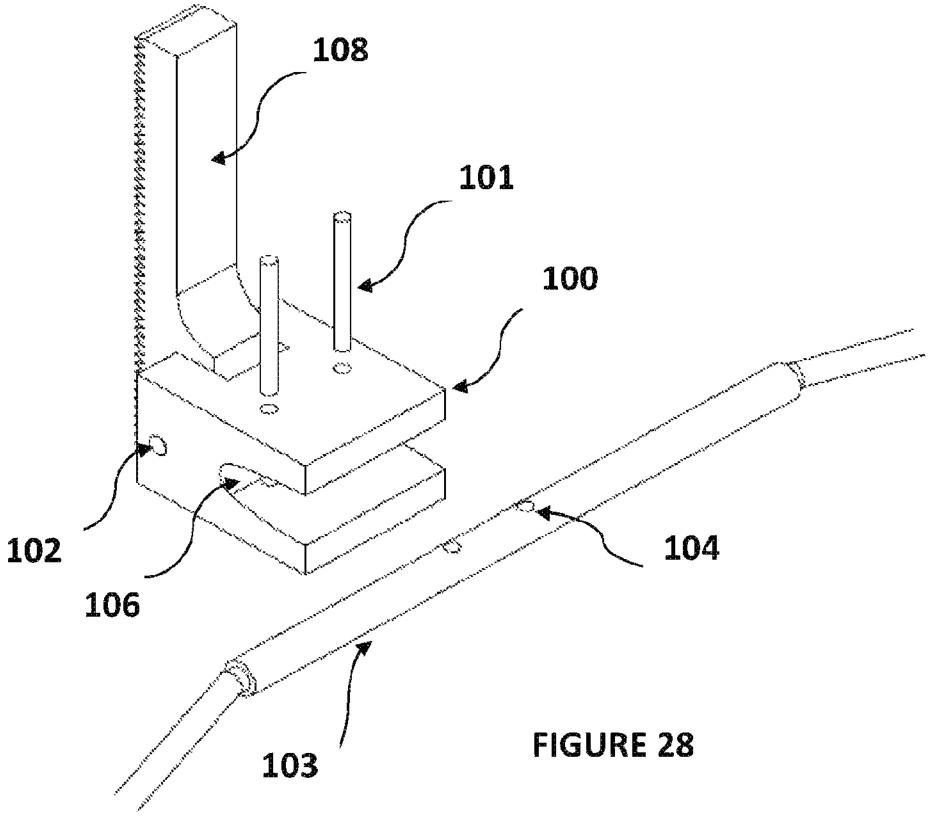
Figure 29:
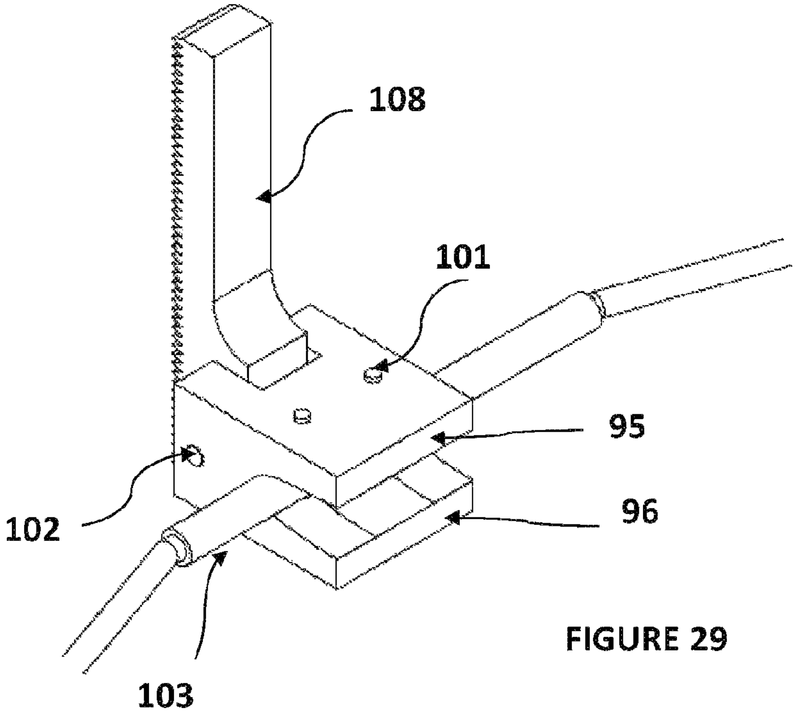
Figure 30:
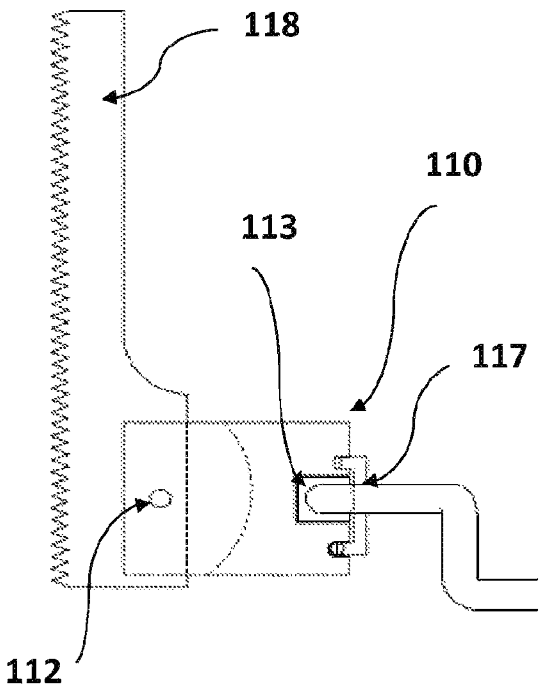
FIGS. 30 to 33 are a schematic side and perspective views of a fifth embodiment of rotatable unit and connected translation element.
Figure 31:
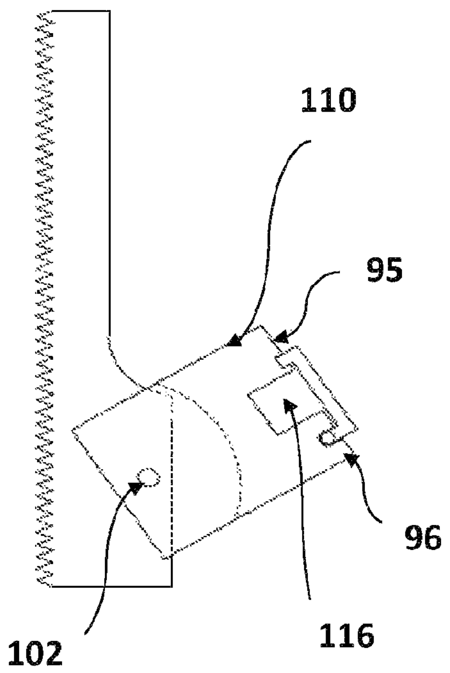
Figure 32:
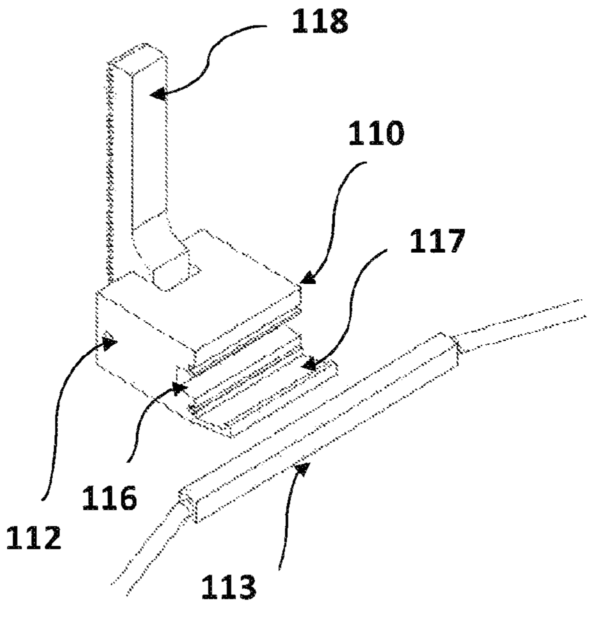

Having regard to FIGS. 26 to 29, there is shown a further embodiment of the rotatable unit 100, comprising upper and lower jaw parts 95, 96 that are not relatively moveable. The rotatable unit 100 is able to rotate relative to the shaft 108 via pivot pin 102 that is inserted into a thicker lower section of the drive shaft 108. There are further provided locking pins 101 which are able to be inserted into the upper surface of the rotatable unit 100 and extend through the unit to lock swing 103 in a fixed (and non-relatively rotating) arrangement with the rotatable unit. In the embodiment depicted in FIGS. 28 and 29, the swing 103 has a circular cross-section and two locking pin receiving apertures 104. The receiving means of the rotatable unit 100 includes a curved shape 106 which is complementary to the shape of circular swing 103 for and able to receive the swing 103 in a close fitting arrangement as depicted in FIG. 26.

Figure 33:
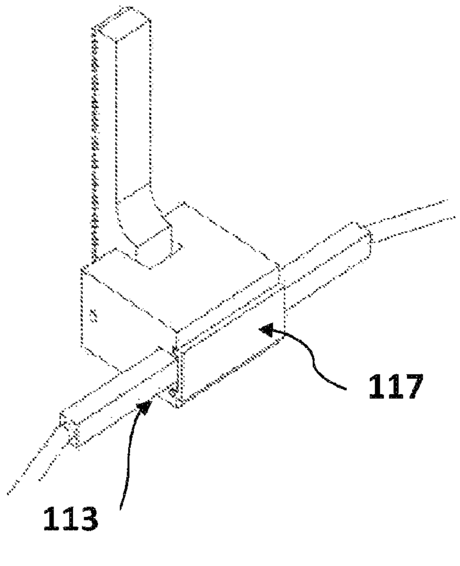

Having regard to FIGS. 30 to 33, there is shown a further embodiment of the rotatable unit 110, comprising upper and lower jaw parts 115, 116 that are not relatively moveable. The rotatable unit 110 is able to rotate relative to the shaft 118 via pivot pin 112 that is inserted into a thicker lower section of the drive shaft 118. There is further provided locking latch 117 which lockingly engages with the upper jaw 95 upon being closed. Once the swing 113 is received into the jaw, and the latch 117 is locked closed, it locked into a fixed and non-relatively rotating arrangement with the rotatable unit 110. In the embodiment depicted in FIGS. 28 and 29, the swing 113 has a square cross-section. The receiving means of the rotatable unit 110 includes a partial square shape 116 which is complementary to the shape of square swing 113 and able to receive the swing 113 in a close fitting arrangement as depicted in FIG. 33. It will be appreciated that once the swing 113 is locked to the rotatable unit 110, it will rotate together with rotatable unit, relative to the shaft 118.

Each of the shafts 92, 92A, 108 and 118 include a gear (i.e. a rack) which in shafts 92, 108 and 118 is linear, and in shaft 92A is curved. The gear on the shafts is adapted to engage with a circular gear or pinion which is located on the body of the bin aid and which is able to be controlled by controlling means (not shown) to move the shaft and translate the shaft and thereby the rotatable element at least downwardly and/or upwardly.

General Statements

It will be appreciated by those skilled in the art that many modifications and variations may be made to the embodiments described herein without departing from the spirit and scope of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Throughout the specification and claims, the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features, that it directly references, but also other components, steps or features not specifically listed, unless the contrary is expressly stated or the context requires otherwise.

In the present specification, terms such as "part", "component", "means", "section", "element", "segment", may refer to singular or plural items and are terms intended to refer to a set of properties, functions or characteristics performed by one or more items having one or more parts. It is envisaged that where a "part", "component", "means", "element", "section", "segment", or similar term is described as consisting of a single item, then a functionally equivalent object consisting of multiple items is considered to fall within the scope of the term; and similarly, where a "part", "component", "means", "element", "section", "segment", or similar term is described as consisting of multiple items, a functionally equivalent object consisting of a single item is considered to fall within the scope of the term. The intended interpretation of such terms described in this paragraph should apply unless the contrary is expressly stated or the context requires otherwise.

The term "connected" or a similar term, should not be interpreted as being limitative to direct connections only. Thus, the scope of the expression a device A connected to a device B should not be limited to devices or systems wherein an output of device A is directly connected to an input of device B. It means that there exists a path between an output of A and an input of B which may be a path including other devices or means. "Connected", or a similar term, may mean that two or more elements are either in direct physical or electrical contact, or that two or more elements are not in direct contact with each other yet still co-operate or interact with each other.

The dimensions provided in relation to the illustrative bin aid are not intended to be prescriptive of all bin aids falling within the scope of the invention. The dimensions are provided for illustrative purposes only and should not be construed otherwise.

The mere disclosure of a product or method element in the specification should not be construed as being essential to the invention claimed herein, except where it is either expressly stated to be so or expressly recited in a claim.

The terms in the claims have the broadest scope of meaning they would have been given by a person of ordinary skill in the art as of the relevant date.

The terms "a" and "an" mean "one or more", unless expressly specified otherwise.

Neither the title nor any abstract of the present application should be taken as limiting in any way the scope of the claimed invention.

Where the preamble of a claim recites a purpose, benefit or possible use of the claimed invention, it does not limit the claimed invention to having only that purpose, benefit or possible use.

INDUSTRIAL APPLICABILITY

It is apparent from the above, that the arrangements described are applicable to industries, such as the manufacturing of bin or bin accessories.

The claims defining the invention are as follows:

1. A bin aid adapted to raise and lower a bin lid of an existing bin, the bin aid including:

a main body;

a connection component functionally connectable with the main body and able to functionally engage with the bin lid of the existing bin, the connection component including a rotatable unit and a bin lid engaging element for engaging with the bin lid of the existing bin; and a controller to selectively control the connection component;

wherein, the rotatable unit includes a receiving part for receiving the bin lid engaging element, and the receiving part is able to lock together with the bin lid engaging element; and when the bin lid is engaged with the bin lid engaging element and the receiving part is locked together with the bin lid engaging element, the connection component is able to selectively raise and lower the bin lid;

wherein the receiving part includes a jaw, the jaw having an upper or lower portion, the upper or lower portion being movable to open and receive, and being movable to close and lock together with, the bin lid engaging element; and wherein the bin lid engaging element includes at least one lifter at an end of the one or more arms, the at least one lifter for engaging with the underside of the lid.

2. The bin aid according to claim 1, wherein the bin lid engaging element includes a swing able to lock together with the rotatable unit such that the swing and rotatable unit move together when the rotatable unit moves.

3. The bin aid according to claim 2, wherein the rotatable unit is able to rotate and translate the swing.

4. The bin aid according to claim 3, wherein the rotatable unit is adapted to pull the swing downwardly.

5. The bin aid according to claim 4, wherein the rotatable unit or swing is able to translate upwardly or downwardly.

6. The bin aid according to claim 5, wherein downward translation of the rotatable unit or swing enables raising the bin lid, and upward translation of the rotatable unit or swing enables lowering of the bin lid.

7. The bin aid according to claim 6, wherein the rotatable unit or swing is able to translate inwardly towards or outwardly away from the bin, and inward translation of the rotatable unit or swing enables raising the bin lid and outward translation enables lowering the bin lid.

8. The bin aid according to claim 2, wherein the swing includes at least one portion having a shape that is complementary to the shape of a portion of the receiving part of the rotatable unit, and the complementary shaped portion of the swing has a non-circular cross section.

9. The bin aid according to claim 8, wherein the complementary shaped portion of the swing has a rectangular cross-section.

10. The bin aid according to claim 9, wherein the complementary shaped portion of the swing comprises a middle portion of the swing.

11. The bin aid according to claim 2, wherein the bin lid engaging element is adapted to raise or lower the bin lid by applying a force to the underside of the bin lid, and the force is able to be applied by pivoting the bin lid engaging element upon the existing bin.

12. The bin aid according to claim 11, wherein the bin lid engaging element includes one or more arms that extend outwardly from the swing.

13. The bin aid according to claim 1, wherein each at least one lifter includes a lifting element for engaging the underside surface of the bin lid and resting on an upper surface of a rim of the existing bin when the bin lid is in a closed position.

14. The bin aid according to claim 1, wherein each at least one lifter includes a shaped connection to pivot on a bin handle of the bin.

15. The bin aid according to claim 1, wherein the bin lid engaging element is adapted to have an adjustable width to extend across an adjustable width of the bin lid.

16. The bin aid according to claim 15, wherein the bin lid engaging element is able to engage with a first underside section of the bin lid, and a second opposing underside section of the bin lid.

17. The bin aid according to claim 1, wherein the connection component includes a translation element for moving the rotatable unit, and the translation element is cyclically movable by a drive unit.

18. The bin aid according to claim 17, wherein the translation element includes a shaft that is drivable by the drive unit, and the shaft includes a rack for interacting with a pinion in the drive unit.

19. The bin aid according to claim 1, wherein the rotatable unit includes a direct receiving component for directly receiving the bin lid.

20. The bin aid according to claim 19, wherein the direct receiving component is able to lock together with the bin lid such that the bin lid and direct receiving component move together when the direct receiving component moves.

21. The bin aid according to claim 20, wherein the direct receiving component is adapted to rotate and translate a rearward portion of the bin lid.

22. A bin aid according to claim 1, wherein the bin aid is separable from the existing bin and bin lid.

23. A bin aid according to claim 1, wherein the bin aid is adapted to engage with an existing bin including one or more wheels, and the bin is able to be wheeled away from the bin aid when the connection component is not functionally engaged with the bin or the bin lid of said bin.

24. A bin aid according to claim 1, wherein the bin aid is free standing and includes a base and intermediate section located between the main body and the base.

25. A bin aid according to claim 1, wherein the bin aid is adapted to be fixed to a separate structure to locate the connection component at a height relative to the bin lid, and at a distance from said separate structure, to enable the connection component to connect to the bin lid.

26. A bin aid according to claim 1, wherein the main body includes photocell for responding to ambient light, the bin aid includes a bin aid light to illuminate an area around the bin aid, and when light intensity measured by the photocell is below a pre-determined threshold, the bin aid light automatically turns on; and when light intensity measured by the photocell is above a pre-determined threshold, the bin aid light automatically turns off.

27. A bin aid according to claim 1, wherein the bin aid includes a washer jet for spraying a de-odourising or animal or insect deterring liquid into the bin, the liquid is stored in a refillable tank located on the main body, the refillable tank includes a liquid sensor to indicate when the liquid in the tank is low, and the liquid sensor is electronically connected to an indicator able to indicate when the liquid in the tank is low.

* * * * *